United States Patent
Jacobs et al.

(12) 
(10) Patent No.: US 6,316,560 B1
(45) Date of Patent: Nov. 13, 2001

(54) METHOD FOR PRODUCING CYCLOOLEFIN POLYMERS

(75) Inventors: Alexandra Jacobs, Niedernhausen; Gerhard Fink, Mülheim an der Ruhr; Dieter Ruchatz, Hasselroth, all of (DE)

(73) Assignee: Ticona GmbH (DE)

( * ) Notice: Subject to any disclaimer, the term of this patent is extended or adjusted under 35 U.S.C. 154(b) by 0 days.

(21) Appl. No.: 09/331,133

(22) PCT Filed: Dec. 16, 1997

(86) PCT No.: PCT/EP97/07050

§ 371 Date: Jul. 29, 1999

§ 102(e) Date: Jul. 29, 1999

(87) PCT Pub. No.: WO98/27126

PCT Pub. Date: Jun. 25, 1998

(30) Foreign Application Priority Data

Dec. 17, 1996 (DE) ................................ 196 52 340

(51) Int. Cl.$^7$ ............... C08F 4/16; C08F 4/44; C08F 12/32; C08F 12/36
(52) U.S. Cl. ................ 526/160; 526/281; 526/282; 526/308; 526/336; 526/339; 526/348.6; 526/916; 526/943; 525/240; 502/152
(58) Field of Search .................. 526/281, 282, 526/308, 336, 339, 348.6, 916, 160, 161, 943; 525/240; 502/152

(56) References Cited

U.S. PATENT DOCUMENTS

| 5,545,829 | * | 8/1996 | Brekner et al. ............. 526/160 |
| 5,733,991 | * | 3/1998 | Rohrmann et al. .......... 526/160 |
| 5,756,623 | * | 5/1998 | Kreuder et al. ............. 526/308 |
| 5,869,586 | * | 2/1999 | Riedel et al. ............... 526/170 |

FOREIGN PATENT DOCUMENTS 0 514 418 A1 * 9/1992 (EP) .
WO 64/17113 * 8/1994 (WO) .

* cited by examiner

Primary Examiner—David W. Wu
Assistant Examiner—R. Harlan
(74) Attorney, Agent, or Firm—Connolly Bove Lodge & Hutz LLP

(57) ABSTRACT

The invention relates to a method for producing a cycloolefin copolymer by polymerization of 0.1–99.0 wt %, with respect to the total amount of monomers, of at least one polycyclic, 0–99.9 wt. %, with respect to the total amount of monomers, of at least one moncyclic olefin, and 0.1–99.9 wt. %, with respect to the total amount of monomers, of at least one acyclic 1-olefin, in the presence of a catalyst system consisting of at least one cocatalyst and at least one metallocene.

25 Claims, No Drawings

METHOD FOR PRODUCING CYCLOOLEFIN POLYMERS

The invention relates to a process for preparing cycloolefin copolymers having high molar masses.

It is known from the literature that cycloolefin homopolymers and copolymers can be prepared using metallocene-aluminoxane catalyst systems (EP-A-283 164, EP-A-407 870). The polymerization of the cycloolefins proceeds here with retention of the rings and can be carried out in solvents or in bulk. As solvents, it is possible to use hydrocarbons.

EP 610 851 describes the preparation of cycloolefin polymers using suitable metallocene catalysts. EP 544 308 describes metallocene catalysts which are suitable for the polymerization of α-olefins.

Cycloolefin copolymers can be prepared with a high cycloolefin content and then have a high glass transition temperature. This is associated with a high heat distortion resistance, which is why these polymers are suitable for use as thermoplastic molding compositions. Cycloolefin copolymers having a low cycloolefin content have a low glass transition temperature. At use temperature, they have a high ductility and can have elastomeric properties.

It is found that cycloolefin copolymers prepared by means of metallocene technology have a relatively low mass average molar mass. In addition, the use of ethylene as comonomer frequently results in formation of partially crystalline ethylene polymers as by-products which can significantly impair the transparency of the cycloolefin copolymers.

It is an object of the present invention to provide a process for preparing cycloolefin copolymers having a relatively high mass average molecular weight together with high transparency and excellent mechanical properties.

The object of the present invention has been achieved by a process for preparing a cycloolefin copolymer by polymerization of from 0.1 to 99.9% by weight, based on the total amount of monomers, of at least one polycyclic olefin, from 0 to 99.9% by weight, based on the total amount of monomers, of at least one monocyclic olefin and from 0.1 to 99.9% by weight, based on the total amount of monomers, of at least one acyclic 1-olefin in the presence of a catalyst system.

The polymerization is carried out in the liquid cycloolefin itself or in cycloolefin solution, with the pressure advantageously being above 1 bar.

The catalyst system used in the process of the invention comprises at least one metallocene of the formula I

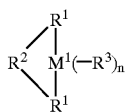

(I)

where
$M^1$ is a metal of groups 3 to 10 or of the lanthanide series of the Periodic Table of the Elements,
$R^1$ are identical or different and are each a cyclopentadienyl group which may be substituted or an indenyl group which may be substituted and partially hydrogenated,
$R^2$ is a single- or multi-membered bridge which links the radicals $R^1$ and comprises at least one boron atom or at least one atom of group 14 of the Periodic Table of the Elements and may, if desired, comprise one or more sulfur or oxygen atoms and can, if desired, form a fused ring system together with $R^1$,
$R^3$ is an anionic or nonionic ligand, where n=0, 1, 2, 3 or 4 depending on the valence of M.

The catalyst system to be used in the process of the invention can further comprise one or more cocatalysts.

The catalyst system to be used in the process of the invention is a highly active catalyst for olefin polymerization. Preference is given to using one metallocene and one cocatalyst. It is also possible to use mixtures of two or more metallocenes, particularly for preparing reactor blends or polyolefins having a broad or multimodal molar mass distribution.

The metallocene to be used in the process of the invention is preferably a compound of the formula I in which
$M^1$ is a metal of group 4 or the lanthanide series of the Periodic Table of the Elements,
$R^1$ are identical or different and are each a cyclopentadienyl group which may be substituted by one or more halogen atoms, one or more $C_1$–$C_{40}$-groups such as $C_1$–$C_{10}$-alkyl groups which may be halogenated, one or more $C_6$–$C_{20}$-aryl groups which may be halogenated, one or more $C_6$–$C_{20}$-aryloxy groups, one or more $C_2$–$C_{12}$-alkenyl groups, one or more $C_7$–$C_{40}$-arylalkyl groups, one or more $C_7$–$C_{40}$-alkylaryl groups, one or more $C_8$–$C_{40}$-arylalkenyl groups, $SiR^4_3$, $NR^4_2$, $Si(OR^4)_3$, $Si(SR^4)_3$ or $PR^4_2$, where $R^4$ are identical or different and are each a halogen atom, a $C_1$–$C_{10}$-alkyl group or a $C_6$–$C_{10}$-aryl group or form a ring system, or an indenyl group which may be substituted by one or more halogen atoms, one or more $C_1$–$C_{40}$-groups such as $C_1$–$C_{10}$-alkyl groups which may be halogenated, one or more $C_6$–$C_{20}$-aryl groups which may be halogenated, one or more $C_6$–$C_{20}$-aryloxy groups, one or more $C_2$–$C_{12}$-alkenyl groups, one or more $C_7$–$C_{40}$-arylalkyl groups, one or more $C_7$–$C_{40}$-alkylaryl groups, one or more $C_8$–$C_{40}$-arylalkenyl groups, $SiR^4_3$, $NR^4_2$, $Si(OR^4)_3$, $Si(SR^4)_3$ or $PR^4_2$, where $R^4$ are identical or different and are each a halogen atom, a $C_1$–$C_{10}$-alkyl group or a $C_6$–$C_{10}$-aryl group or form a ring system, where the indenyl group can also be partially hydrogenated and one of the structures $R^1$ must bear a substituent,
$R^2$ is a single- or multi-membered bridge which links the groups $R^1$ and is preferably

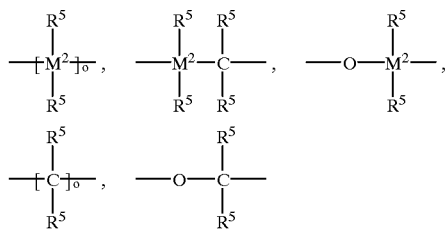

$=BR^5$, $=AlR^5$, -Ge-, -Sn-, -O-, -S-, $=SO$, $=SO_2$, $=NR^5$, $=CO$, $=PR$ or $=P(O)R^5$,
where $R^5$ are identical or different and are each a hydrogen atom, a halogen atom, a $C_1$–$C_{40}$-group such as a $C_1$–$C_{10}$-alkyl group which may be halogenated, a $C_6$–$C_{20}$-aryl group which may be halogenated, a $C_6$–$C_{20}$-aryloxy group, a $C_2$–$C_{12}$-alkenyl group, a $C_7$–$C_{40}$-arylalkyl group, a $C_7$–$C_{40}$-alkylaryl group, a $C_8$–$C_{40}$-arylalkenyl group, $SiR^6_3$, $NR^6_2$, $Si(OR^6)_3$ or $PR^6{}_3$, where $R^6$ are identical or different and are each a halogen atom, a $C_1$–$C_{10}$-alkyl group or a $C_6$–$C_{10}$-aryl group or form a ring system, and $M^2$ is silicon, germanium or tin, $R^3$ are identical or different and are each a hydrogen atom, a $C_1$–$C_{40}$group such as a $C_1$–$C_{10}$-alkyl group, a $C_1$–$C_{10}$-alkoxy group, a $C_6$–$C_{10}$-aryl group, a $C_6$–$C_{25}$-aryloxy group, a $C_2$–$C_{10}$-alkenyl group, a $C_7$–$C_{40}$-arylalkyl group or a $C_7$–$C_{40}$-arylalkenyl group, an OH group, a halogen atom or $NR^7{}_2$, where $R^7$ is a halogen atom, a $C_1$–$C_{10}$-alkyl group or a $C_6$–$C_{10}$-aryl group, or $R^3$ together with the atoms connecting them form a ring system, where n=1 or 2.

The metallocene to be used in the process of the invention is particularly preferably a compound of the formula II

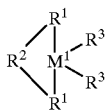

(II)

where $M^1$ is titanium, zirconium or hafnium, $R^1$ is an indenyl group or a 4,5,6,7-tetrahydroindenyl group which is substituted in positions 2 and 3 exclusively by hydrogen atoms and in positions 4, 5, 6 and 7 may bear further substituents such as one or more halogen atoms and/or one or more $C_1$–$C_{10}$-groups in place of hydrogen, $R^{1'}$ is a cyclopentadienyl group which is substituted in position 3 by a $C_2$–$C_{40}$-group such as a $C_2$–$C_{10}$-alkyl group which may be halogenated, a $C_6$–$C_{20}$-aryl group which may be halogenated, a $C_6$–$C_{20}$-aryloxy group, a $C_2$–$C_{12}$-alkenyl group, a $C_7$–$C_{40}$-arylalkyl group, a $C_7$–$C_{40}$-alkylaryl group, a $C_8$–$C_{40}$-arylalkenyl group, $SiR^4{}_3$, $NR^4{}_2$, $SIR(OR^4)_3$, $Si(SR^4)_3$ or $PR^4{}_2$, where $R^4$ are identical or different and are each a halogen atom, a $C_1$–$C_{10}$-alkyl group or a $C_6$–$C_{10}$-aryl group or form a ring system, and in the further positions 2, 4 and 5 may bear further substituents such as one or more $C_1$–$C_{10}$-groups or one or more halogen atoms in place of hydrogen, $R^2$ is a single-, two- or three-membered bridge which links $R^1$ and $R^{1'}$ in each case via position 1 and is preferably

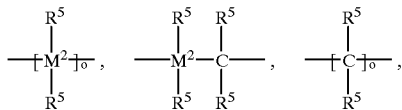

where $R^5$ are identical or different and are each a hydrogen atom, a $C_1$–$C_{40}$-group such as a $C_1$–$C_{10}$-alkyl group which may be halogenated, a $C_6$–$C_{20}$-aryl group which may be halogenated, a $C_6$–$C_{20}$-aryloxy group, a $C_2$–$C_{12}$-alkenyl group, a $C_7$–$C_{40}$-arylalkyl group, a $C_7$–$C_{40}$-alkylaryl group or a $C_8$–$C_{40}$-arylalkenyl group, where o=1, 2 or 3, $M^2$ is silicon, $R^3$ are identical or different and are each a hydrogen atom, a $C_1$–$C_{40}$-group such as a $C_1$–$C_{10}$-alkyl group, a $C_1$–$C_{10}$-alkoxy group, a $C_6$–$C_{10}$-aryl group, a $C_6$–$C_{25}$-aryloxy group, a $C_2$–$C_{10}$-alkenyl group, a $C_7$–$C_{40}$-arylalkyl group or a $C_7$–$C_{40}$-arylalkenyl group, an OH group, a halogen atom or $NR^7{}_2$, where $R^7$ is a halogen atom, a $C_1$–$C_{10}$-alkyl group or a $C_6$–$C_{10}$-aryl group, or $R^3$ together with the atoms connecting them form a ring system, where n=2.

The metallocene to be used in the process of the invention is very particularly preferably a compound of the formula II in which $M^1$ is zirconium, $R^1$ is an indenyl group which bears no substituents in place of the hydrogen atoms, $R^{1'}$ is a cyclopentadienyl group which is substituted in position 3 by a $C_2$–$C_{10}$-alkyl group such as ethyl, propyl, isopropyl, tert-butyl or n-butyl, by a $C_6$–$C_{20}$-aryl group, a $C_7$–$C_{20}$-arylalkyl group, a $C_7$–$C_{40}$-alkylaryl group, $SiR^4{}_3$, $NR^4{}_2$, $Si(OR^4)_3$, $Si(SR^4)_3$ or $PR^4{}_2$, where $R^4$ are identical or different and are each a halogen atom, a $C_1$–$C_{40}$-alkyl group or a $C_6$–$C_{10}$-aryl group or form a ring system, and in the further positions 2, 4 and 5 bears no substituents in place of the hydrogen atoms, $R^2$ is a single-, two- or three-membered bridge which links $R^1$ and $R^{1'}$ in each case via position 1 and is preferably

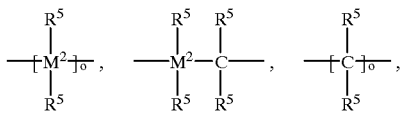

where $R^5$ are identical or different and are each a hydrogen atom, a $C_1$–$C_{40}$-group such as a $C_1$–$C_{10}$-alkyl group which may be halogenated, a $C_6$–$C_{20}$-aryl group which may be halogenated, a $C_6$–$C_{20}$-aryloxy group, a $C_2$–$C_{12}$-alkenyl group, a $C_7$–$C_{40}$-arylalkyl group, a $C_7$–$C_{40}$-alkylaryl group or a $C_8$–$C_{40}$-arylalkenyl group, where o=1, 2 or 3, $M^2$ is silicon, $R^3$ are identical or different and are each a hydrogen atom, a $C_1$–$C_{40}$group such as a $C_1$–$C_{10}$-alkyl group, a $C_1$–$C_{10}$-alkoxy group, a $C_6$–$C_{10}$-aryl group, a $C_6$–$C_{25}$-aryloxy group, a $C_2$–$C_{10}$-alkenyl group, a $C_7$–$C_{40}$-arylalkyl group or a $C_7$–$C_{40}$-arylalkenyl group, an OH group, a halogen atom or $NR^7{}_2$, where $R^7$ is a halogen atom, a $C_1$–$C_{10}$-alkyl group or a $C_6$–$C_{10}$-aryl group, or $R^3$ together with the atoms connecting them form a ring system, where n=2.

Examples of metallocenes to be used according to the invention are:

isopropylene(1-indenyl)(3-methylcyclopentadienyl) zirconium dichloride diphenylmethylene(1-indenyl)(3-methylcyclopentadienyl) zirconium dichloride methylphenylmethylene(1-indenyl)(3-methylcyclopentadienyl)zirconium dichloride isopropylene(1-indenyl)(3-ethylcyclopentadienyl) zirconium dichloride diphenylmethylene(1-indenyl)(3-ethylcyclopentadienyl) zirconium dichloride methylphenylmethylene(1-indenyl) (3-ethylcyclopentadienyl)zirconium dichloride isopropylene(1-indenyl)(3-isopropylcyclopentadienyl) zirconium dichloride diphenylmethylene(1-indenyl)(3-isopropylcyclopentadienyl)zirconium dichloride methylphenylmethylene(1-indenyl)(3-isopropylcyclopentadienyl)zirconium dichloride
isopropylene(1-indenyl)(3-t-butylcyclopentadienyl)zirconium dichloride
diphenylmethylene(1-indenyl)(3-t-butylcyclopentadienyl)zirconium dichloride
methylphenylmethylene(1-indenyl)(3-t-butylcyclopentadienyl)zirconium dichloride
isopropylene(1-indenyl)(3-trimethylsilyicyclopentadienyl)zirconium dichloride
diphenylmethylene(1-indenyl)(3-trimethylsilylcyclopentadienyl)zirconium dichloride
methylphenylmethylene(1-indenyl)(3-trimethylsilylcyclopentadienyl)zirconium dichloride
isopropylene(4,5,6,7-tetrahydro-1-indenyl)(3-trimethylsilylcyclopentadienyl)zirconium dichloride
isopropylene(1-indenyl)(3,4-dimethylcyclopentadienyl)zirconium dichloride
diphenylmethylene(4,5,6,7-tetrahydro-1-indenyl)(3-trimethylsilylcyclopentadienyl)zirconium dichloride
methylphenylmethylene(4,5,6,7-tetrahydro-1-indenyl)(3-trimethylsilylcyclopentadienyl)zirconium dichloride
isopropylene(1-indenyl)(3,4-di-trimethylsilylcyclopentadienyl)zirconium dichloride
diphenylmethylene(1-indenyl)(3,4-di-trimethylsilylcyclopentadienyl)zirconium dichloride
methylphenylmethylene(1-indenyl)(3,4-di-trimethylsilylcyclopentadienyl)zirconium dichloride
isopropylene(1-indenyl)(2,3-di-trimethylsilylcyclopentadienyl)zirconium dichloride
diphenylmethylene(1-indenyl)(2,3-di-trimethylsilylcyclopentadienyl)zirconium dichloride
methylphenylmethylene(1-indenyl)(2,3-di-trimethylsilylcyclopentadienyl) zirconium dichloride
isopropylene(1-indenyl)(3,4-dimethylcyclopentadienyl)zirconium dichloride
diphenylmethylene(1-indenyl)(3,4-dimethylcyclopentadienyl)zirconium dichloride
methylphenylmethylene(1-indenyl)(3,4-dimethylcyclopentadienyl)zirconium dichloride
isopropylene(1-indenyl)(3,4-diethylcyclopentadienyl)zirconium dichloride
diphenylmethylene(1-indenyl)(3,4-diethylcyclopentadienyl)zirconium dichloride
methylphenylmethylene(1-indenyl)(3,4-diethylcyclopentadienyl)zirconium dichloride
isopropylene(1-indenyl)(3,4-diisopropylcyclopentadienyl)zirconium dichloride
diphenylmethylene(1-indenyl)(3,4-diisopropylcyclopentadienyl)zirconium dichloride
methylphenylmethylene(1-indenyl)(3,4-diisopropylcyclopentadienyl)zirconium dichloride
isopropylene(1-indenyl)(3,4-di-t-butylcyclopentadienyl)zirconium dichloride
diphenylmethylene(1-indenyl)(3,4-di-t-butylcyclopentadienyl)zirconium dichloride
methylphenylmethylene(1-indenyl)(3,4-di-t-butylcyclopentadienyl)zirconium dichloride
isopropylene(1-indenyl)(2,3-dimethylcyclopentadienyl)zirconium dichloride
diphenylmethylene(1-indenyl)(2,3-dimethylcyclopentadienyl)zirconium dichloride
methylphenylmethylene(1-indenyl)(2,3-dimethylcyclopentadienyl)zirconium dichloride
isopropylene(1-indenyl)(2,3-diethylcyclopentadienyl)zirconium dichloride
diphenylmethylene(1-indenyl)(2,3-diethylcyclopentadienyl)zirconium dichloride
methylphenylmethylene(1-indenyl)(2,3-diethylcyclopentadienyl)zirconium dichloride
isopropylene(1-indenyl)(2,3-diisopropylcyclopentadienyl)zirconium dichloride
diphenylmethylene(1-indenyl)(2,3-diisopropylcyclopentadienyl)zirconium dichloride
methylphenylmethylene(1-indenyl)(2,3-diisopropylcyclopentadienyl)zirconium dichloride
isopropylene(1-indenyl)(2,3-di-t-butylcyclopentadienyl)zirconium dichloride
diphenylmethylene(1-indenyl)(2,3-di-t-butylcyclopentadienyl)zirconium dichloride
methylphenylmethylene(1-indenyl)(2,3-di-t-butylcyclopentadienyl)zirconium dichloride
isopropylene(1-indenyl)(tetramethylcyclopentadienyl)zirconium dichloride
diphenylmethylene(1-indenyl)(tetramethylcyclopentadienyl)zirconium dichloride
methylphenylmethylene(1-indenyl)(tetramethylcyclopentadienyl)zirconium dichloride
isopropylene(4,5,6,7-tetrahydro-1-indenyl)(3-methylcyclopentadienyl)zirconium dichloride
diphenylmethylene(4,5,6,7-tetrahydro-1-indenyl)(3-methylcyclopentadienyl)zirconium dichloride
methylphenylmethylene(4,5,6,7-tetrahydro-1-indenyl)(3-methylcyclopentadienyl)zirconium dichloride
isopropylene(4,5,6,7-tetrahydro-1-indenyl)(3-ethylcyclopentadienyl)zirconium dichloride
diphenylmethylene(4,5,6,7-tetrahydro-1-indenyl)(3-ethylcyclopentadienyl)zirconium dichloride
methylphenylmethylene(4,5,6,7-tetrahydro-1-indenyl)(3-ethylcyclopentadienyl)zirconium dichloride
isopropylene(4,5,6,7-tetrahydro-1-indenyl)(3-isopropylcyclopentadienyl)zirconium dichloride
diphenylmethylene(4,5,6,7-tetrahydro-1-indenyl)(3-isopropylcyclopentadienyl)zirconium dichloride
methylphenylmethylene(4,5,6,7-tetrahydro-1-indenyl)(3-isopropylcyclopentadienyl)zirconium dichloride
isopropylene(4,5,6,7-tetrahydro-1-indenyl)(3-t-butylcyclopentadienyl)zirconium dichloride
diphenylmethylene(4,5,6,7-tetrahydro-1-indenyl)(3-t-butylcyclopentadienyl)zirconium dichloride
methylphenylmethylene(4,5,6,7-tetrahydro-1-indenyl)(3-t-butylcyclopentadienyl)zirconium dichloride
isopropylene(4,5,6,7-tetrahydro-1-indenyl)(3,4-dimethylcyclopentadienyl)zirconium dichloride
diphenylmethylene(4,5,6,7-tetrahydro-1-indenyl)(3,4-dimethylcyclopentadienyl)zirconium dichloride
methylphenylmethylene(4,5,6,7-tetrahydro-1-indenyl)(3,4-dimethylcyclopentadienyl)zirconium dichloride
isopropylene(4,5,6,7-tetrahydro-1-indenyl)(3,4-diethylcyclopentadienyl)zirconium dichloride
diphenylmethylene(4,5,6,7-tetrahydro-1-indenyl)(3,4-diethylcyclopentadienyl)zirconium dichloride
methylphenylmethylene(4,5,6,7-tetrahydro-1-indenyl)(3,4-diethylcyclopentadienyl)zirconium dichloride
isopropylene(4,5,6,7-tetrahydro-1-indenyl)(3,4-diisopropylcyclopentadienyl)zirconium dichloride
diphenylmethylene(4,5,6,7-tetrahydro-1-indenyl)(3,4-diisopropylcyclopentadienyl)zirconium dichloride
methylphenylmethylene(4,5,6,7-tetrahydro-1-indenyl)(3,4-diisopropylcyclopentadienyl)zirconium dichloride
isopropylene(4,5,6,7-tetrahydro-1-indenyl)(3,4-di-t-butylcyclopentadienyl)zirconium dichloride
diphenylmethylene(4,5,6,7-tetrahydro-1-indenyl)(3,4-di-t-butylcyclopentadienyl)zirconium dichloride
methylphenylmethylene(4,5,6,7-tetrahydro-1-indenyl)(3,4-di-t-butylcyclopentadienyl)zirconium dichloride isopropylene(4,5,6,7-tetrahydro-1-indenyl)(2,3-dimethylcyclopentadienyl)zirconium dichloride
diphenylmethylene(4,5,6,7-tetrahydro-1-indenyl)(2,3-dimethylcyclopentadienyl)zirconium dichloride
methylphenylmethylene(4,5,6,7-tetrahydro-1-indenyl)(2,3-dimethylcyclopentadienyl)zirconium dichloride
isopropylene(4,5,6,7-tetrahydro-1-indenyl)(2,3-dimethylcyclopentadienyl)zirconium dichloride
diphenylmethylene(4,5,6,7-tetrahydro-1-indenyl)(2,3-diethylcyclopentadienyl)zirconium dichloride
methylphenylmethylene(4,5,6,7-tetrahydro-1-indenyl)(2,3-diethylcyclopentadienyl)zirconium dichloride
isopropylene(4,5,6,7-tetrahydro-1-indenyl)(2,3-diisopropylcyclopentadienyl)zirconium dichloride
diphenylmethylene(4,5,6,7-tetrahydro-1-indenyl)(2,3-diisopropylcyclopentadienyl)zirconium dichloride
methylphenylmethylene(4,5,6,7-tetrahydro-1-indenyl)(2,3-diisopropylcyclopentadienyl)zirconium dichloride
isopropylene(4,5,6,7-tetrahydro-1-indenyl)(2,3-di-t-butylcyclopentadienyl)zirconium dichloride
diphenylmethylene(4,5,6,7-tetrahydro-1-indenyl)(2,3-di-t-butylcyclopentadienyl)zirconium dichloride
methylphenylmethylene(4,5,6,7-tetrahydro-1-indenyl)(2,3-di-t-butylcyclopentadienyl)zirconium dichloride
isopropylene(4,5,6,7-tetrahydro-1-indenyl)(tetramethylcyclopentadienyl)zirconium dichloride
diphenylmethylene(4,5,6,7-tetrahydro-1-indenyl)(tetramethylcyclopentadienyl)zirconium dichloride
methylphenylmethylene(4,5,6,7-tetrahydro-1-indenyl)(tetramethylcyclopentadienyl)zirconium dichloride Particular preference is given to:
isopropylene(1-indenyl)(3-isopropylcyclopentadienyl)zirconium dichloride
diphenylmethylene(1-indenyl)(3-isopropylcyclopentadienyl)zirconium dichloride
methylphenylmethylene(1-indenyl)(3-isopropylcyclopentadienyl)zirconium dichloride
isopropylene(1-indenyl)(3-t-butylcyclopentadienyl)zirconium dichloride
diphenylmethylene(1-indenyl)(3-t-butylcyclopentadienyl)zirconium dichloride
methylphenylmethylene(1-indenyl)(3-t-butylcyclopentadienyl)zirconium dichloride
isopropylene(4,5,6,7-tetrahydro-1-indenyl)(3-isopropylcyclopentadienyl)zirconium dichloride
diphenylmethylene(4,5,6,7-tetrahydro-1-indenyl)(3-isopropylcyclopentadienyl)zirconium dichloride
methylphenylmethylene(4,5,6,7-tetrahydro-1-indenyl)(3-isopropylcyclopentadienyl)zirconium dichloride
isopropylene(1-indenyl)(3-trimethylsilylcyclopentadienyl)zirconium dichloride
diphenylmethylene(1-indenyl)(3-trimethylsilylcyclopentadienyl)zirconium dichloride
methylphenylmethylene(1-indenyl)(3-trimethylsilylcyclopentadienyl)zirconium dichloride
isopropylene(4,5,6,7-tetrahydro-1-indenyl)(3-t-butylcyclopentadienyl)zirconium dichloride
diphenylmethylene(4,5,6,7-tetrahydro-1-indenyl)(3-t-butylcyclopentadienyl)zirconium dichloride
methylphenylmethylene(4,5,6,7-tetrahydro-1-indenyl)(3-t-butylcyclopentadienyl)zirconium dichloride
isopropylene(4,5,6,7-tetrahydro-1-indenyl)(3-trimethylsilylcyclopentadienyl)zirconium dichloride
diphenylmethylene(4,5,6,7-tetrahydro-1-indenyl)(3-trimethylsilylcyclopentadienyl)zirconium dichloride
methylphenylmethylene(4,5,6,7-tetrahydro-1-indenyl)(3-trimethylsilylcyclopentadienyl)zirconium dichloride In the process of the invention, the cocatalyst used is preferably an aluminoxane which preferably has the formula IIIa for the linear type and/or the formula IIIb for the cyclic type,

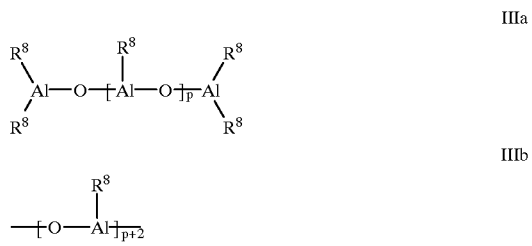

where, in the formulae IIIa and IIIb, the radicals $R^8$ are identical or different and are each a $C_1$–$C_6$-alkyl group, a $C_6$–$C_{18}$-aryl group, benzyl or hydrogen and n is an integer from 2 to 50, preferably from 10 to 35. Preferably, the radicals $R^8$ are identical and are methyl, isobutyl, phenyl or benzyl, particularly preferably methyl.

If the radicals $R^8$ are different, they are preferably methyl and hydrogen or alternatively methyl and isobutyl, with hydrogen or isobutyl preferably being present in a proportion by number of from 0.01 to 40% (of the radicals $R^8$).

The aluminoxane can be prepared in various ways by known methods. One of the methods is, for example, reacting an aluminum hydrocarbon compound and/or a hydridoaluminum hydrocarbon compound with water (gaseous, solid, liquid or bound, for example as water of crystallization) in an inert solvent (such as toluene). To prepare an aluminoxane having different alkyl groups $R^8$, two different trialkylaluminums ($AlR_3$+$AlR'_3$) corresponding to the desired composition are reacted with water (S. Pasynkiewicz, Polyhedron 9 (1990) 429, EP-A-302 424). The precise three-dimensional structure of the aluminoxanes is not known.

Regardless of the method of preparation, all aluminoxane solutions have in common a varying content of unreacted aluminum starting compound which is present in free form or as adduct.

It is also possible to apply the aluminoxane to a support and then to use it as a suspension in supported form. A number of methods of applying the aluminoxane to a support are known (EP-A-578 838). Silica gel can function as support.

It is possible to preactivate the metallocene to be used in the process of the invention by means of a cocatalyst, in particular an aluminoxane, prior to use in the polymerization reaction. This significantly increases the polymerization activity.

The preactivation of the transition metal compound is carried out in solution. Here, the metallocene is preferably dissolved in a solution of the aluminoxane in an inert hydrocarbon. Suitable inert hydrocarbons are aliphatic or aromatic hydrocarbons. Preference is given to using toluene.

The concentration of the aluminoxane in the solution is in the range from about 1% by weight to the saturation limit, preferably from 5 to 30% by weight, in each case based on the total solution. The metallocene can be used in the same concentration, but it is preferably used in an amount of from $10^{-4}$ to 1 mol per mol of aluminoxane. The preactivation time is from 5 minutes to 60 hours, preferably from 5 to 60 minutes. The preactivation is carried out at a temperature of from −78 to 100° C., preferably from 0 to 70° C.

A prepolymerization can be carried out with the aid of the metallocene. For the prepolymerization, preference is given to using the (or one of the) olefin(s) used in the polymerization.

The metallocene can also be applied to a support. Suitable supports are, for example, silica gels, aluminum oxides, solid aluminoxane or other inorganic support materials. A polyolefin powder in finely divided form is also a suitable support material.

A further possible embodiment of the process of the invention comprises using a salt-like compound of the formula $R_xNH_{4-x}BR'_4$ or of the formula $R_3PHBR'_4$ as cocatalyst in place of or in addition to an aluminoxane. Here, x=1, 2 or 3, R=alkyl or aryl, identical or different, and R'=aryl which may be fluorinated or partially fluorinated. In this case, the catalyst comprises the reaction product of a metallocene with one of the compounds mentioned (EP-A-277 004).

If solvents are added to the reaction mixture, they are customary inert solvents such as aliphatic or cycloaliphatic hydrocarbons, petroleum fractions or hydrogenated diesel oil fractions or toluene.

The metallocenes are preferably used in the form of their racemates. The metallocene is preferably employed in a concentration, based on the transition metal, of from $10^{-1}$ to $10^{-8}$ mol, preferably from $10^{-2}$ to $10^{-7}$ mol, particularly preferably from $10^{-3}$ to $10^{-7}$ mol, of transition metal per dm$^3$ of reactor volume. The aluminoxane is used in a concentration of from $10^{-4}$ to $10^{-1}$ mol, preferably from $10^{-4}$ to $2\times10^{-2}$ mol, per dm$^3$ of reactor volume, based on the aluminum content. However, higher concentrations are also possible in principle.

The invention provides a process for preparing a cycloolefin copolymer by polymerization of from 0.1 to 99.9% by weight, based on the total amount of monomers, of at least one polycyclic olefin of the formula IV, V, V', VI, VII, VIII or IX

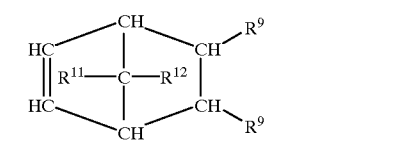
(IV)

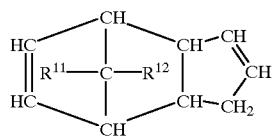
(V)

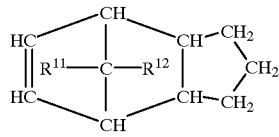
(V')

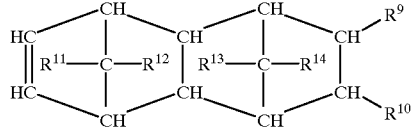
(VI)

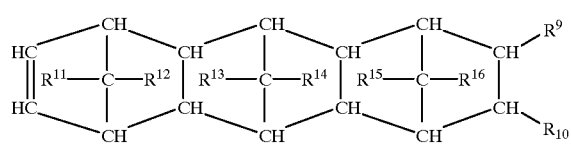
(VII)

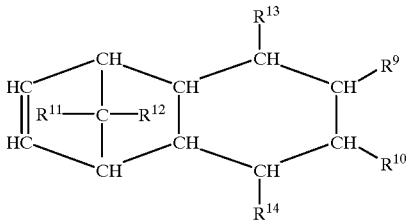
(VIII)

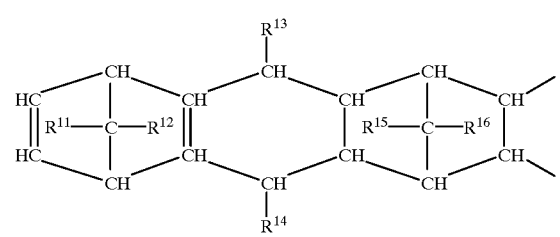
(IX)

where $R^9$, $R^{10}$, $R^{11}$, $R^{12}$, $R^{13}$, $R^{14}$, $R^{15}$, and $R^{16}$ are identical or different and are each a hydrogen atom or a hydrocarbon radical, where identically numbered radicals in the various formulae can also have different meanings, from 0 to 99.9% by weight, based on the total amount of the monomers, of at least one monocyclic olefin of the formula X

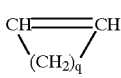
(X)

where q is from 2 to 10, and from 0.1 to 99.9% by weight, based on the total amount of monomers, of at least one acyclic 1-olefin of the formula XI

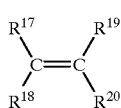
(XI)

where $R^{17}$, $R^{18}$, $R^{19}$ and $R^{20}$ are identical or different and are each a hydrogen atom or a hydrocarbon radical, preferably a $C_6$–$C_{10}$-aryl radical or a $C_1$–$C_8$-alkyl radical, at temperatures of from −78 to 150° C., in particular from 0 to 100° C., and a pressure of from 0.01 to 64 bar.

Preference is given to cycloolefins of the formula IV or VI in which $R^9$, $R^{10}$, $R^{11}$, $R^{12}$, $R^{13}$, $R^{14}$, $R^{15}$ and $R^{16}$ are identical or different and are each a hydrogen atom or a hydrocarbon radical, in particular a $C_6$–$C_{10}$-aryl radical or a $C_1$–$C_8$-alkyl radical, where identically numbered radicals in the various formulae can have different meanings.

If desired, one or more monocyclic olefins of the formula X are used for the polymerization.

Preference is also given to an acyclic olefin of the formula XI in which $R^{17}$ $R^{18}$, $R^{19}$ and $R^{20}$ are identical or different and are each a hydrogen atom or a hydrocarbon radical, preferably a $C_6$–$C_{10}$-aryl radical or a $C_1$–$C_8$-alkyl radical, for example ethylene or propylene.

In particular, copolymers of polycyclic olefins, preferably of the formulae IV and VI, with ethylene are prepared.

Particularly preferred polycyclic olefins are norbornene and tetracyclododecene; these may be substituted by $C_1$–$C_6$- alkyl. They are preferably copolymerized with ethylene. Very particular preference is given to ethylene-norbornene copolymers and ethylene-tetracyclododecene copolymers.

The polycyclic olefin is used in an amount of from 0.1 to 99.9% by weight and the monocyclic olefin is used in an amount of from 0 to 99.9% by weight, in each case based on the total amount of monomers.

The concentration of the acyclic olefin used is determined by its solubility in the reaction medium at the given pressure and the given temperature.

For the purposes of the present invention, polycyclic olefins, monocyclic olefins and acyclic olefins include mixtures of two or more olefins of the respective type. This means that it is possible to prepare not only polycyclic bicopolymers but also tercopolymers and multicopolymers by the process of the invention. Copolymers of monocyclic olefins and acyclic olefins can also be obtained by the process described.

Among the monocyclic olefins, preference is given to cyclopentene, which may be substituted.

The process of the invention is preferably carried out at temperatures of from −78 to 150° C., in particular from 0 to 100° C., and a pressure of from 0.01 to 64 bar.

In the preparation of copolymers, the molar ratio of the polycyclic olefin to the open-chain olefin used can be varied within a wide range. Preference is given to using molar ratios of cycloolefin to open-chain olefin of from 3:1 to 200:1. Selection of the polymerization temperature, the concentration of the catalyst components and the molar ratio or pressure of the gaseous, open-chain olefin enables the proportion of comonomer incorporated to be controlled almost as desired. Preference is given to incorporated proportions of the cyclic components of from 5 to 80 mol %, particularly preferably from 15 to 60 mol % and very particularly preferably from 35 to 55 mol %.

The cycloolefin copolymers prepared by the process of the invention have glass transition temperatures of from −50 to 220° C. Preference is given to glass transition temperatures of from 0 to 180° C., particularly preferably from 60 to 150° C.

The polymerization can also be carried out in a plurality of stages, so that block copolymers can also be formed (DE-A-42 05 416).

The mean molar mass of the polymer formed can be controlled in a known manner by metering-in hydrogen, varying the catalyst concentration or varying the temperature.

The cycloolefin copolymers prepared by the process of the invention have mass average molar masses $M_w$ of from 1000 to 10,000,000 g/mol. Preference is given to mass average molar masses of from 10,000 to 5,000,000 g/mol, particularly preferably from 50,000 to 1,200,000 g/mol.

The cycloolefin copolymers prepared by the process of the invention have viscosity numbers of from 10 to 1000 ml/g, preference is given to viscosity numbers of from 30 to 500 ml/g, particularly preferably from 50 to 300 ml/g.

Cycloolefin copolymers which have not been prepared by the process of the invention have a low molar mass and a low toughness, so that these materials are of little interest for commercial use.

It has now surprisingly been found that cycloolefin copolymers having significantly higher molar masses can be prepared over a wide range of glass transition temperatures by the process of the invention. The cycloolefin copolymers prepared by the process of the invention have a higher melting resistance and toughness and are therefore of particular interest for commercial use.

The cycloolefin copolymers prepared by the process of the invention surprisingly have a high elongation at break.

The elongation at break R of the cycloolefin polymers prepared by the process of the invention has values of $R \geq -0.0375\, T_g + 12$. The cycloolefin copolymers prepared by the process of the invention preferably have values of $R \geq -0.0375\, T_g + 17$. The cycloolefin copolymers prepared by the process of the invention particularly preferably have values of $R \geq -0.0375\, T_g + 22$.

Owing to the high elongation at break which has surprisingly been found, the cycloolefin copolymers prepared by the process of the invention are distinctly superior to those of the prior art.

In addition to excellent resistance to thermal and chemical influences, the moldings produced from cycloolefin copolymers prepared by the process of the invention have very good resistance to mechanical stresses such as tensile, flexural and impact stresses. This means that the cycloolefin copolymers prepared by the process of the invention can be used in a wide variety of applications.

As a rheological parameter which is easy to determine and is related directly to the mechanical properties of plastics, the plateau modulus $G'_p$ describes the excellent properties of the cycloolefin copolymers prepared by the process of the invention.

The elastic properties of polymer melts can be determined by a vibrational experiment. Here, the storage modulus G' is a measure of the deformation energy which can be stored reversibly by the polymer. At relatively high applied frequencies, the storage modulus G' goes through a rubber-elastic plateau (plateau zone) [Retting, W., H. H. Laun, Kunststoffphysik, Carl Hansen Verlag, 1991; Ferry, J. D., Viscoelastic Properties of Polymers, J. Wiley & Sons, 1980]. In the plateau zone, the value of the storage modulus is determined by the network of intermeshed polymer molecules. In this region, the applied frequency is so high that the molecules can no longer slide off one another, so that the temporary intermeshing points have the same effect as permanent crosslinking points in chemically crosslinked polymers. The energy introduced is taken up only by the flexible chain segments between the intermeshing points. The storage modulus G' in the region of the rubber-elastic plateau is defined as the plateau modulus $G'_p$. The plateau modulus $G'_p$ serves as a measure for the energy which can be taken up by the temporary network.

The relationship between the plateau modulus and the mechanical properties of polymeric solids is comprehensively described in the specialist literature. [Aharoni, S. M., Macromolecules 18, 2624 (1985); Mikar, A. G. et al., J. Chem. Phys. 88, 1337 (1988); Mikar, A. G. et al., J. Polym. Sci. B 27, 837 (1991); Wu, S., J. Polym. Sci 327, 723 (1989); Wu, S., Polym. Int. 29, 229 (1992)].

It has surprisingly been found that the cycloolefin copolymers prepared by the process of the invention have a plateau modulus which is high compared to conventional cycloolefin copolymers. The plateau modulus of the cycloolefin polymers prepared by the process of the invention preferably has values which obey the following relationship:

$$\log G'_p \geq -0.0035 T_g + 6$$

The plateau modulus of the cycloolefin polymers prepared by the process of the invention particularly preferably has values which obey the following relationship:

$$\log G'_p \geq -0.0035 T_g + 6.03$$

The plateau modulus of the cycloolefin polymers prepared by the process of the invention very particularly preferably has values which obey the following relationship:

$$\log G'_p \geq -0.0035 T_g + 6.06$$

The polydispersity $M_w/M_n$ of the copolymers has values of from 1.5 to 3.5 and is therefore quite narrow. This results in a property profile which makes the copolymers particularly suitable for injection molding. It is also possible to obtain a polydispersity beyond the indicated limits by selection of the catalyst system. Apart from monomodal distributions, cycloolefin copolymers having bimodal or multimodal distributions can also be prepared by the process of the invention.

If catalyst systems which are not as specified in the process of the invention are chosen, it is possible for ethylene polymers which reduce the transparency of the material to be formed in addition of the cycloolefin copolymers. In addition, the insolubility of these ethylene polymers leads to formation of deposits during the process, which deposits interfere with the production process and require regular cleaning work.

It has now surprisingly been found that no ethylene polymers are formed when employing the catalyst system to be used in the process of the invention. The process of the invention enables cycloolefin copolymers of high transparency to be prepared.

A particular advantage which has been found is the high effectiveness of the process of the invention in respect of the extremely high activity of the catalyst system. This enables significantly higher yields of cycloolefin copolymers to be achieved by the process of the invention compared to processes which are not according to the invention. Thus, the process of the invention offers a considerable economic advantage in terms of the catalyst costs.

Both in extrusion and in injection molding, neither decomposition reactions nor a decrease in viscosity have been found at temperatures of 300° C.

The materials prepared according to the invention are particularly suitable for producing moldings such as extruded parts (films, sheets, hoses, pipes, rods and fibers) or injection-molded articles of any shape and size. Important properties of the materials of the invention are their transparency, their purity, the favorable mechanical properties, the low water absorption and the high barrier action against water vapor.

The index of refraction of the reaction products described in the following examples determined using an Abbe refractometer and mixed light is in the range from 1.520 to 1.555. Since the index of refraction is very close to that of crown glass (n=1.51), the products according to the invention can be employed as a substitute for glass in various applications in the optical field, for example lenses, prisms, support plates and films for optical data storage, for video disks, for compact disks, as covering and focusing plates for solar cells, as covering and scattering plates for power optics, as optical waveguides in the form of fibers or films. Owing to the property profile described, the materials prepared according to the invention are of great interest in the field of medical technology. They are used as materials for catheters, bags for infusion solutions or dialysis fluid, for tubing, containers, implants and components of medical apparatus. In addition, they are used in the form of injection-molded parts for containers, bottles, vials and syringes for the storage, exchange or application of liquids. The properties of the cycloolefin copolymers prepared according to the invention make them particularly suitable for use in the form of films for the pharmaceutical, food and industrial sectors.

In impact-modified form, the materials prepared according to the invention can also be used as structural materials in various engineering areas (DE-A-42 13 219).

The polymers obtained according to the invention can also be used for producing polymer blends. The blends can be produced in the melt or in solution. The blends have a property combination of the components which is in each case favorable for particular applications. For blends with the polymers of the invention, preference is given to using the following polymers:

polyethylene, polypropylene, 1-(ethylene-propylene) copolymers, polybutylene, poly-(4methyl-1-pentene), polyisoprene, polyisobutylene, natural rubber, poly-1-(methyl methacrylate), further polymethacrylates, polyacrylates, (acrylate-methacrylate)copolymers, polystyrene, (styrene-acrylonitrile)copolymers, bisphenol A polycarbonate, further polycarbonates, aromatic polyester carbonates, polyethylene terephthalate, polybutylene terephthalate, amorphous polyarylates, nylon 6, nylon 66, further polyamides, polyaramides, polyether ketones, polyoxymethylene, polyoxyethylene, polyurethanes, polysulfones, polyether sulfones, polyvinylidene fluoride.

Surfaces of workpieces and moldings produced from the cycloolefin copolymers of the invention can be modified by suitable methods such as fluorination, corona treatment, flame treatment and plasma treatment. In this way, properties such as adhesion or printability can be altered without the requirement of the present invention being impaired.

The process of the invention gives transparent cycloolefin copolymers having high molar masses at a particularly high catalyst activity.

The glass transition temperatures $T_g$ reported in the following examples were determined by means of DSC (differential scanning colorimetry) at a heating rate of 20° C./min. The viscosity numbers VN reported were determined in o-dichlorobenzene at 135° C. in accordance with DIN 53728. The mass average molar mass and the polydispersity were determined by means of GPC.

Elongations at break and yield stresses were determined in a tensile test in accordance with ISO 527, parts 1 and 2, at a strain rate of 50 mm/min.

The rheological properties of the melt for determining the plateau modulus were determined in a dynamic vibrational experiment using a shear-rate controlled instrument from Rheometrics having a plate-plate geometry at frequencies of from $10^{-1}$ to $5 \times 10^2 s^{-1}$.

The measure employed for the catalyst activity is the yield of polymer per unit time and per mmol of metallocene:

$$\text{Activity} = \frac{\text{Polymer [g]}}{\text{Time [h]} \times \text{amount of metallocene [mmol]}} = A$$

The invention is illustrated by the following examples:

EXAMPLES

Example 1

600 cm$^3$ of a 50% strength by weight solution of norbornene in toluene are placed in a 1.5 dm$^3$ autoclave which has previously been thoroughly purged with ethene. The solution was saturated with ethene by multiple pressurization with ethene (6 bar). 10 cm$^3$ of methylaluminoxane solution in toluene (10% strength by weight methylaluminoxane solution having a molar mass of 1300 g/mol according to cryoscopic determination) were metered in countercurrent into the reactor which had been prepared in this way and the mixture was stirred for 30 minutes at 70° C. A solution of 0.37 mg of isopropylene(1-indenyl)(3-t-butylcyclopentadienyl)zirconium dichloride in 10 cm$^3$ of methylaluminoxane solution in toluene was added after preactivation for 15 minutes. While stirring (750 rpm), polymerization was carried out for one hour, with the ethene pressure being maintained at 6 bar by metering in further amounts.

After the end of the reaction time, the polymerization mixture was drained into a vessel and immediately introduced into 5 dm$^3$ of acetone, stirred for 10 minutes and the precipitated product was subsequently filtered off. The filter cake was washed alternately with three portions each of 10% hydrochloric acid and acetone, the residue was slurried in acetone and filtered off again. The polymer which had been purified in this way was dried at 80° C. under reduced pressure (0.2 bar) for 15 hours.

This gave 40 g of colorless polymer which had a glass transition temperature of 139° C., a viscosity number of 185 ml/g, a weight average molar mass of 147,000 g/mol and a polydispersity of 1.9. The activity A* was 47,300 g/(mmol h).

Example 2

600 cm$^3$ of a 50% strength by weight solution of norbornene in toluene are placed in a 1.5 dm$^3$ autoclave which has previously been thoroughly purged with ethene. The solution was saturated with ethene by multiple pressurization with ethene (3 bar). 10 cm$^3$ of methylaluminoxane solution in toluene (10% strength by weight methylaluminoxane solution having a molar mass of 1300 g/mol according to cryoscopic determination) were metered in countercurrent into the reactor which had been prepared in this way and the mixture was stirred for 30 minutes at 70° C. A solution of 0.61 mg of isopropylene(1-indenyl)(3-t-butylcyclopentadienyl)zirconium dichloride in 10 cm$^3$ of methylaluminoxane solution in toluene was added after preactivation for 15 minutes.

While stirring (750 rpm), polymerization was carried out for one hour, with the ethene pressure being maintained at 3 bar by metering in further amounts.

After the end of the reaction time, the polymerization mixture was drained into a vessel and immediately introduced into 5 dm$^3$ of acetone, stirred for 10 minutes and the precipitated product was subsequently filtered off. The filter cake was washed alternately with three portions each of 10% hydrochloric acid and acetone, the residue was slurried in acetone and filtered off again. The polymer which had been purified in this way was dried at 80° C. under reduced pressure (0.2 bar) for 15 hours. This gave 29 g of colorless polymer which had a glass transition temperature of 156° C., a viscosity number of 260 ml/g, a weight average molar mass of 271,000 g/mol and a polydispersity 2.5. The activity A was 20,700 g/(mmol h).

Example 3

600 cm$^3$ of a 50% strength by weight solution of norbornene in toluene are placed in a 1.5 dm$^3$ autoclave which has previously been thoroughly purged with ethene. The solution was saturated with ethene by multiple pressurization with ethene (12 bar). 10 cm$^3$ of methylaluminoxane solution in toluene (10% strength by weight methylaluminoxane solution having a molar mass of 1300 g/mol according to cryoscopic determination) were metered in countercurrent into the reactor which had been prepared in this way and the mixture was stirred for 30 minutes at 70° C. A solution of 0.13 mg of isopropylene(1-indenyl)(3-t-butylcyclopentadienyl)zirconium dichloride in 10 cm$^3$ of methylaluminoxane solution in toluene was added after preactivation for 15 minutes.

While stirring (750 rpm), polymerization was carried out for one hour, with the ethene pressure being maintained at 12 bar by metering in further amounts.

After the end of the reaction time, the polymerization mixture was drained into a vessel and immediately introduced into 5 dm$^3$ of acetone, stirred for 10 minutes and the precipitated product was subsequently filtered off. The filter cake was washed alternately with three portions each of 10% hydrochloric acid and acetone, the residue was slurried in acetone and filtered off again. The polymer which had been purified in this way was dried at 80° C. under reduced pressure (0.2 bar) for 15 hours.

This gave 45 g of colorless polymer which had a glass transition temperature of 107° C., a viscosity number of 108 ml/g, a weight average molar mass of 82,000 g/mol and a polydispersity 1.8. The activity A was 151,800 g/(mmol h).

Example 4

600 cm$^3$ of a 50% strength by weight solution of norbornene in toluene are placed in a 1.5 dm$^3$ autoclave which has previously been thoroughly purged with ethene. The solution was saturated with ethene by multiple pressurization with ethene (18 bar). 10 cm$^3$ of methylaluminoxane solution in toluene (10% strength by weight methylaluminoxane solution having a molar mass of 1300 g/mol according to cryoscopic determination) were metered in countercurrent into the reactor which had been prepared in this way and the mixture was stirred for 30 minutes at 70° C. A solution of 0.06 mg of isopropylene(1-indenyl)(3-t-butylcyclopentadienyl)zirconium dichloride in 10 cm$^3$ of methylaluminoxane solution in toluene was added after preactivation for 15 minutes.

While stirring (750 rpm), polymerization was carried out for one hour, with the ethene pressure being maintained at 18 bar by metering in further amounts.

After the end of the reaction time, the polymerization mixture was drained into a vessel and immediately introduced into 5 dm$^3$ of acetone, stirred for 10 minutes and the precipitated product was subsequently filtered off. The filter cake was washed alternately with three portions each of 10% hydrochloric acid and acetone, the residue was slurried in acetone and filtered off again. The polymer which had been purified in this way was dried at 80° C. under reduced pressure (0.2 bar) for 15 hours.

This gave 22 g of colorless polymer which had a glass transition temperature of 85° C., and a viscosity number of 94 ml/g. The activity A was 160,800 g/(mmol h).

Examples 5 and 6

600 cm$^3$ of a solution of norbornene in toluene are placed in a 1.5 $^3$ autoclave which has previously been thoroughly purged with ethene. The solution was saturated with ethene by multiple pressurization with ethene (18 bar). 5 cm$^3$ of methylaluminoxane solution in toluene (10% strength by weight methylaluminoxane solution having a molar mass of 300 g/mol according to cryoscopic determination) were metered in countercurrent into the reactor which had been prepared in this way and the mixture was stirred for 30 minutes at 70° C. A solution of isopropylene(1-indenyl)(3-t-butylcyclopentadienyl)zirconium dichloride in 5 cm$^3$ of methylaluminoxane solution in toluene was added after preactivation for 15 minutes.

While stirring (750 rpm), polymerization was carried out for one hour, with the ethene pressure being maintained at 18 bar by metering in further amounts.

After the end of the reaction time, the polymerization mixture was drained into a vessel and immediately introduced into 5 dm³ of acetone, stirred for 10 minutes and the precipitated product was subsequently filtered off. The filter cake was washed alternately with three portions each of 10% hydrochloric acid and acetone, the residue was slurried in acetone and filtered off again. The polymer which had been purified in this way was dried at 80° C. under reduced pressure (0.2 bar) for 15 hours.

This gave a colorless polymer. The further reaction conditions and the characteristic data of the polymer are summarized in Table 1.

TABLE 1

| Ex. | Monomer solution [% by weight of norbornene] | Amount of catalyst [mg] | Activity A* [g/mmol h] | Yield [g] | $T_g$ [° C.] | VM [ml/g] |
|---|---|---|---|---|---|---|
| 5 | 50 | 0.05 | 92,100 | 10.5 | 83 | 80 |
| 6 | 30 | 0.09 | 238,800 | 49 | 46 | 64 |

Examples 7 and 15

400 cm³ of an 85% strength by weight solution of norbornene in toluene are placed in a 1 dm³ autoclave which has previously been thoroughly purged with ethane. The solution was saturated with ethene by multiple pressurization with ethene. 1 cm³ of methylaluminoxane solution in toluene (10% strength by weight methylaluminoxane solution having a molar mass of 1300 g/mol according to cryoscopic determination) were metered in countercurrent into the reactor which had been prepared in this way and the mixture was stirred for 30 minutes at 70° C. A solution of 0.35 mg of isopropylene(1-indenyl)(3-t-butylcyclopentadienyl)zirconium dichloride in 1 cm³ of methylaluminoxane solution in toluene was added after preactivation for 15 minutes.

Polymerization was carried out while stirring (800 rpm), with the ethene pressure being maintained by metering in further doses.

After the end of the reaction time, the polymerization mixture was drained into a vessel and immediately introduced into 5 dm³ of acetone, stirred for 10 minutes and the precipitated product was subsequently filtered off. The filter cake was washed three times with acetone. The polymer obtained in this way was dried at 70° C. under reduced pressure (0.2 bar) for 15 hours. This gave a colorless polymer. The further reaction conditions and the characteristic data of the polymer are summarized in Tables 2 and 3.

TABLE 2

| Ex. | Ethylene pressure [bar] | Polymerization time [min] | Yield [g] | Activity A* [g/(mmol)] |
|---|---|---|---|---|
| 7 | 20.9 | 10 | 19.2 | 144,000 |
| 8 | 14.9 | 15 | 18.1 | 90,500 |
| 9 | 10.4 | 15 | 13 | 65,000 |
| 10 | 4.7 | 34 | 11.3 | 24,200 |
| 11 | 26.2 | 10 | 26 | 195,000 |

TABLE 2-continued

| Ex. | Ethylene pressure [bar] | Polymerization time [min] | Yield [g] | Activity A* [g/(mmol)] |
|---|---|---|---|---|
| 12 | 32.5 | 10 | 32 | 240,000 |
| 13 | 39.9 | 11 | 45.3 | 308,900 |
| 14 | 46.5 | 11 | 56 | 381,800 |
| 15 | 58 | 8 | 52 | 487,500 |

TABLE 3

| Ex. | Tg [° C] | VM [ml/g] | $M_w$ [g/mol] | $M_w/M_n$ |
|---|---|---|---|---|
| 7 | 121 | 169 | 222,000 | 1.6 |
| 8 | 135 | 226 | 322,000 | 1.5 |
| 9 | 145 | 307 | 422,000 | 1.7 |
| 10 | 155 | — | 793,000 | 1.5 |
| 11 | 113 | 147 | 189,000 | 1.6 |
| 12 | 99.5 | — | 162,000 | 1.5 |
| 13 | 85 | 90 | 128,000 | 1.6 |
| 14 | 76 | 92 | 104,000 | 1.6 |
| 15 | 57 | 84 | 83,000 | 1.6 |

Example 16

400 cm³ of a 42% strength by weight solution of norbornene in toluene are placed in a 1 dm³ autoclave which has previously been purged thoroughly with ethene. The solution was saturated with ethene by multiple pressurization with ethene (53.6 bar). 1 cm³ of methylaluminoxane solution in toluene (10% strength by weight methylaluminoxane solution having a molar mass of 1300 g/mol according to cryoscopic determination) was metered in countercurrent into the reactor which had been prepared in this way and the mixture was stirred for 30 minutes at 70° C. A solution of 0.35 mg of isopropylene(1-indenyl)(3-t-butylcyclopentadienyl)zirconium dichloride in 1 cm³ of methylaluminoxane solution in toluene was added after preactivation for 15 minutes.

While stirring (800 rpm), polymerization was carried out for 8 minutes, with the ethene pressure being maintained at 53.6 bar by metering in further amounts.

After the end of the reaction time, the polymerization mixture was drained into a vessel and immediately introduced into 5 dm³ of acetone, stirred for 10 minutes and the precipitated product was subsequently filtered off. The filter cake was washed three times with acetone. The polymer obtained in this way was dried at 70° C. under reduced pressure (0.2 bar) for 15 hours.

This gave 70 g of colorless polymer which had a glass transition temperature of 13° C., a viscosity number of 67 ml/g, a weight average molar mass of 57,000 g/mol and a polydispersity of 1.5. The activity A* was 656,300 g/(mmol h).

Comparative Examples 1 to 3

A solution of norbornene in toluene was placed in a 70 dm³ autoclave which had previously been purged thoroughly with ethene. The solution was saturated with ethene by multiple pressurization with ethene. 400 cm³ of methylaluminoxane solution in toluene (10% strength by weight methylaluminoxane solution having a molar mass of 1300 g/mol according to cryoscopic determination) were metered in countercurrent into the reactor which had been prepared in this way and the mixture was stirred for 30 minutes at 70° C. After preactivation for 30 minutes, a solution of isopropylene(cyclopentadienyl)(1-indenyl)zirconium dichloride in 300 cm³ of methylaluminoxane solution in toluene was added.

While stirring (750 rpm), polymerization was carried out for one hour, with the ethene pressure being maintained by metering in further amounts.

After the end of the reaction time, the polymerization mixture was drained into a vessel and immediately introduced into 300 dm³ of acetone, stirred for 30 minutes and the precipitated product was subsequently filtered off. The filter cake was washed alternately with three portions each of 10% hydrochloric acid and acetone, the residue was slurried in acetone and filtered off again. The polymer which had been purified in this way was dried at 80° C. under reduced pressure (0.2 bar) for 15 hours.

This gave a colorless polymer. The further reaction conditions and the characteristic data of the polymer are summarized in Tables 4 and 5.

TABLE 4

| Comp. Ex. | Monomer solution [% by weight of norbornene] | Monomer solution [dm³] | Catalyst [mg] | Ethylene pressure [bar] | Yield [kg] |
| --- | --- | --- | --- | --- | --- |
| 1 | 60 | 30 | 100 | 20 | 8 |
| 2 | 40 | 50 | 160 | 22 | 7.4 |
| 3 | 40 | 32 | 100 | 20 | 7 |

TABLE 5

| Comp. Ex. | Activity A* [g/(mmol*h)] | $T_g$ [° C.] | VM [ml/g] | $M_w$ [bar] | $M_w/M_n$ |
| --- | --- | --- | --- | --- | --- |
| 1 | 30,600 | 105 | 47 | 29,000 | 1.9 |
| 2 | 17,700 | 89 | 41 | 21,000 | 1.9 |
| 3 | 26,800 | 82 | 38 | 21,000 | 1.8 |

Comparative Examples 4 to 7

600 cm³ of a solution of norbornene in toluene are placed in a 1.5 dm³ autoclave which has previously been purged thoroughly with ethene. The solution was saturated with ethene by multiple pressurization with ethene (18 bar). 5 cm³ of methylaluminoxane solution in toluene (10% strength by weight methylaluminoxane solution having a molar mass of 1300 g/mol according to cryoscopic determination) were metered in countercurrent into the reactor which had been prepared in this way and the mixture was stirred for 30 minutes at 70° C. A solution of isopropylene(1-indenyl)(cyclopentadienyl)zirconium dichloride in 5 cm³ of methylaluminoxane solution in toluene was added after preactivation for 15 minutes.

While stirring (750 rpm), polymerization was carried out for one hour, with the ethene pressure being maintained by metering in further amounts.

After the end of the reaction time, the polymerization mixture was drained into a vessel and immediately introduced into 5 dm³ of acetone, stirred for 10 minutes and the precipitated product was subsequently filtered off. The filter cake was washed alternately with three portions each of 10% hydrochloric acid and acetone, the residue was slurried in acetone and filtered off again. The polymer which had been purified in this way was dried at 80° C. under reduced pressure (0.2 bar) for 15 hours.

This gave a colorless polymer. The further reaction conditions and the characteristic data of the polymer are summarized in Tables 6 and 7.

TABLE 6

| Comp. Ex. | Monomer solution [% by weight of norbornene] | Catalyst [mg] | Ethylene pressure [bar] |
| --- | --- | --- | --- |
| 4 | 85 | 1.2 | 6 |
| 5 | 50 | 1.03 | 3 |
| 6 | 85 | 1.14 | 18 |
| 7 | 50 | 0.45 | 12 |

TABLE 7

| Comp. Ex. | Yield [kg] | Activiy A [g/(mmol h)] | $T_g$ [° C.] | VN [ml/g] |
| --- | --- | --- | --- | --- |
| 4 | 44.8 | 14,300 | 184 | 67 |
| 5 | 33.6 | 12,500 | 181 | 81 |
| 6 | 99.8 | 33,500 | 140 | 78 |
| 7 | 55.6 | 36,400 | 122 | 64 |

Comparative Examples 8 to 11

A solution of 600 cm³ of norbornene in toluene was placed in a 1.5 dm³ autoclave which had previously been purged thoroughly with ethene. The solution was saturated with ethene by multiple pressurization with ethene (6 bar). 20 cm³ of methylaluminoxane solution in toluene (10% strength by weight methylaluminoxane solution having a molar mass of 1300 g/mol according to cryoscopic determination) were metered in countercurrent into the reactor which had been prepared in this way and the mixture was stirred for 30 minutes at 70° C. A solution of dimethylsilylbis(1-indenyl)zirconium dichloride in 20 cm³ of methylaluminoxane solution in toluene was added after preactivation for 15 minutes.

While stirring (750 rpm), polymerization was carried out for one hour, with the ethene pressure being maintained at 6 bar by metering in further amounts.

After the end of the reaction time, the polymerization mixture was drained into a vessel and immediately introduced into 5 dm³ of acetone, stirred for 10 minutes and the precipitated product was subsequently filtered off. The filter cake was washed alternately with three portions each of 10% hydrochloric acid and acetone, the residue was slurried in acetone and filtered off again. The polymer which had been purified in this way was dried at 80° C. under reduced pressure (0.2 bar) for 15 hours.

This gave a colorless polymer. The further reaction conditions and the characteristic data of the polymer are summarized in Table 8.

TABLE 8

| Comp Ex. | Monomer solution [% by weight of norbornene] | Amount of catalyst [mg] | Yield [g] | Activity A* [g/(mmol*h)] | $T_g$ [° C.] | m.p. [° C.] | VN [ml/g] |
| --- | --- | --- | --- | --- | --- | --- | --- |
| 8 | 85 | 5 | 21 | 1884 | 122 | 122 | 45 |
| 9 | 85 | 5 | 20 | 1794 | 178 | 118 | 65 |
| 10 | 80 | 0.5 | 2.5 | 2243 | 138 | 120 | 45 |
| 11 | 30 | 60 | 180 | 1346 | 103 | 115 | 86 |

Comparative Examples 12 to 15

A solution of 600 cm³ of norbornene in toluene was placed in a 1.5 dm³ autoclave which had previously been purged thoroughly with ethene. The solution was saturated with ethene by multiple pressurization with ethene. 10 cm³ of methylaluminoxane solution in toluene (10% strength by weight methylaluminoxane solution having a molar mass of 1300 g/mol according to cryoscopic determination) were metered in countercurrent into the reactor which had been prepared in this way and the mixture was stirred for 30 minutes at 70° C. A solution of 1.8 mg of dimethylsilyl (cyclopentadienyl)(1-indenyl)zirconium dichloride in 10 cm³ of methylaluminoxane solution in toluene was added after preactivation for 15 minutes.

While stirring (750 rpm), polymerization was carried out for one hour, with the ethene pressure being maintained by metering in further amounts.

After the end of the reaction time, the polymerization mixture was drained into a vessel and immediately introduced into 5 dm³ of acetone, stirred for 10 minutes and the precipitated product was subsequently filtered off. The filter cake was washed alternately with three portions each of 10% hydrochloric acid and acetone, the residue was slurried in acetone and filtered off again. The polymer which had been purified in this way was dried at 80° C. under reduced pressure (0.2 bar) for 15 hours.

This gave a colorless polymer. The further reaction conditions and the characteristic data of the polymer are summarized in Table 9.

TABLE 9

| Comp Ex. | Monomer solution [% by weight of norbornene] | Ethylene pressure [bar] | Yield [g] | Activity A* [g/(mmol*h)] | Tg [° C.] | VN [ml/g] |
|---|---|---|---|---|---|---|
| 12 | 85 | 6 | 9.4 | 2081 | 214 | 68 |
| 13 | 85 | 18 | 14.6 | 3232 | 161 | 130 |
| 14 | 50 | 18 | 33.9 | 7505 | 112 | 132 |
| 15 | 30 | 18 | 46.8 | 10,361 | 68 | 130 |

Examples 17 to 28

600 cm³ of a solution of norbornene in a solvent were placed in a 1.5 dm³ autoclave which had previously been purged thoroughly with ethene. The solution was saturated with ethene by multiple pressurization with ethene. A solution of methylaluminoxane in toluene (10% strength by weight methylaluminoxane solution having a molar mass of 1300 g/mol according to cryoscopic determination) was metered in countercurrent into the reactor which had been prepared in this way and the mixture was stirred for 30 minutes at 70° C. A solution of the metallocene in a methylaluminoxane solution in toluene was added after preactivation for 15 minutes.

While stirring (750 rpm), polymerization was carried out for one hour, with the ethene pressure being maintained by metering in further amounts.

After the end of the reaction time, the polymerization mixture was drained into a vessel and immediately introduced into 5 dm³ of acetone, stirred for 10 minutes and the precipitated product was subsequently filtered off. The filter cake was washed alternately with three portions each of 10% hydrochloric acid and acetone, the residue was slurried in acetone and filtered off again. The polymer which had been purified in this way was dried at 80° C. under reduced pressure (0.2 bar) for 15 hours.

This gave a colorless polymer. The further reaction conditions and the characteristic data of the polymer as summarized in Tables 10 and 11.

TABLE 10

| Example | Monomer solution [% by weight of norbornene] | Solvent | Methylaluminoxane solution [ml] | Amount of metallocene [mg] | Methylaluminoxane solution for metallocene [ml] | Ethene pressure [bar] |
|---|---|---|---|---|---|---|
| 17 | 50 | toluene | 10 | 0.06 | 10 | 18 |
| 18 | 30 | toluene | 5 | 0.09 | 5 | 18 |
| 19 | 50 | toluene | 5 | 0.15 | 5 | 18 |
| 20 | 50 | toluene | 10 | 0.08 | 10 | 6 |
| 21 | 50 | toluene | 10 | 0.04 | 10 | 18 |
| 22 | 50 | toluene | 10 | 0.6 | 10 | 6 |
| 23 | 50 | decalin | 5 | 0.16 | 5 | 18 |
| 24 | 50 | decalin | 2 | 0.67 | 2 | 18 |
| 25 | 45 | decalin | 1 | 0.34 | 1 | 18 |
| 26 | 45 | decalin | 1 | 0.29 | 1 | 18 |
| 27 | 45 | decalin | 2.5 | 0.3 | 2.5 | 18 |
| 28 | 45 | decalin | 1 | 1.47 | 1 | 18 |

Examples 17, 18, 19, 22, 23 and 24
The metallocene used was isopropylene(1-indenyl)(3-t-butylcyclopenta-dienyl)zirconium dichloride.
Examples 20, 21, 25, 26, 27 and 28
The metallocene used was isopropylene(1-indenyl)(3-i-propylcyclopenta-dienyl)zirconium dichloride.

TABLE 11

| Example | Yield [g] | $T_g$ [° C.] | VN [ml/g] | Activity [g/(mmol h)] | $G_p$[Pa] |
|---|---|---|---|---|---|
| 17 | 22 | 84.5 | 93.7 | 161,000 | 678,000 |
| 18 | 49 | 46.5 | 63.8 | 239,000 | 700,000 |
| 19 | 20 | 90.8 | 97.7 | 58,500 | 648,000 |
| 20 | 29.5 | 147.6 | 121.1 | 157,000 | 363,000 |
| 21 | 35 | 97.8 | 75.6 | 307,000 | 582,000 |
| 22 | 50.9 | 131.9 | 1O1.8 | 37,200 | 529,000 |
| 23 | 26 | 95.8 | 97.1 | 71,300 | 549,000 |
| 24 | 65 | 89.5 | 71.0 | 42,500 | 514,000 |
| 25 | 16 | 110.5 | 116.7 | 20,000 | 515,000 |
| 26 | 29 | 109.2 | 77.2 | 42,400 | 542,000 |
| 27 | 33.2 | 99.8 | 90.4 | 47,000 | 557,000 |
| 28 | 65.3 | 105.7 | 95.6 | 18,900 | 534,000 |

Examples 29 to 32

A 50% strength by weight solution of norbornene in toluene was placed in a 70 dm³ autoclave which had previously been purged thoroughly with ethene. The solution was saturated with ethene by multiple pressurization with ethene. A methylaluminoxane solution in toluene (10% strength by weight methylaluminoxane solution having a molar mass of 1300 g/mol according to cryoscopic determination) was metered in countercurrent into the reactor which had been prepared in this way and the mixture was stirred for 30 minutes at 70° C. A solution of the metallocene in a methylaluminoxane solution in toluene was added after preactivation for 30 minutes.

While stirring (750 rpm), polymerization was carried out for one hour, with the ethene pressure being maintained by metering in further amounts.

After the end of the reaction time, the polymerization mixture was drained into a vessel and immediately introduced into 300 dm³ of acetone, stirred for 30 minutes and the precipitated product was subsequently filtered off. The filter cake was washed alternately with three portions each of 10% hydrochloric acid and acetone, the residue was slurried in acetone and filtered off again. The polymer which had been purified in this way was dried at 80° C. under reduced pressure (0.2 bar) for 15 hours.

This gave a colorless polymer. The further reaction conditions and the characteristic data of the polymer are summarized in Tables 12 and 13.

TABLE 12

| Example | Methyl-aluminoxane solution [ml] | Amount metallocene [mg] | Methylaluminoxane solution for metallocene [ml] | Ethene pressure [bar] |
|---|---|---|---|---|
| 29 | 50 | 60 | 250 | 20 |
| 30 | 50 | 30 | 300 | 20 |
| 31 | 50 | 15 | 150 | 20 |
| 32 | 50 | 15 | 125 | 20 |

Examples 29 and 32

The metallocene used was isopropylene(1-indenyl)(3-t-butylcyclopenta-dienyl)zirconium dichloride.

Examples 30 and 31

The metallocene used was isopropylene(1-indenyl)(3-i-propylcyclopenta-dienyl)zirconium dichloride.

TABLE 13

| Example | $T_g$ [°C.] | VN [ml/g] | Elongation at break [%] | Yield stress [MPa] | Ethene pressure [bar] |
|---|---|---|---|---|---|
| 29 | 80 | 83 | >92 | 56 | 20 |
| 30 | 92 | 74 | 58 | 60 | 20 |
| 31 | 96 | 80 | 33 | 63 | 20 |
| 32 | 86 | 84 | 50 | 57 | 20 |

Comparative Examples 16 to 25

600 cm³ of a solution of norbornene in toluene are placed in a 1.5 dm³ autoclave which has previously been purged thoroughly with ethene. The solution was saturated with ethene by multiple pressurization with ethene. 5 ml of methylaluminoxane solution in toluene (10% strength by weight methylaluminoxane solution having a molar mass of 1300 g/mol according to cryoscopic determination) was metered in countercurrent into the reactor which had been prepared in this way and the mixture was stirred for 30 minutes at 70° C. A solution of the metallocene in 5 ml of methylaluminoxane solution in toluene was added after preactivation for 15 minutes.

While stirring (750 rpm), polymerization was carried out for one hour, with the ethene pressure being maintained by metering in further amounts.

After the end of the reaction time, the polymerization mixture was drained into a vessel and immediately introduced into 5 dm³ of acetone, stirred for 10 minutes and the precipitated product was subsequently filtered off. The filter cake was washed alternately with three portions each of 10% hydrochloric acid and acetone, the residue was slurried in acetone and filtered off again. The polymer which had been purified in this way was dried at 80° C. under reduced pressure (0.2 bar) for 15 hours.

This gave a colorless polymer. The further reaction conditions and the characteristic data of the polymer are summarized in Tables 14 and 15.

TABLE 14

| Comparative example | Monomer solution [% by weight of norbornene] | Metallocene | Amount of metallocene [mg] | Ethene pressure [bar] |
|---|---|---|---|---|
| 16 | 85 | isopropylene(1-indenyl)-cyclopentadienylzirconium dichloride | 1.5 | 6 |
| 17 | 85 | dimethylsilylbis(1-indenyl)-zirconium dichloride | 10 | 6 |
| 18 | 85 | diphenytmethytene(9-fluorenyl)cyctopentadienyl zirconium dichloride | 2.7 | 6 |
| 19 | 85 | isopropylene(4,5-benzo-1-indenyl)cyclopentadienylzirconium dichloride | 1 | 6 |
| 20 | 85 | dimethytsilyl(4,5-benzo-1-indenyl)cyctopentadienylzirconium dichloride | 1 | 6 |
| 21 | 50 | isopropytene(1-indenyl)-cyclopentadienylzirconium dichloride | 1 | 18 |
| 22 | 50 | isopropylenebis(1-indenyl)zirconium dichloride | 1 | 18 |
| 23 | 50 | isopropylenebis(1-indenyl)zirconium dichloride | 1 | 18 |
| 24 | 50 | isopropylenebis(1-indenyl)zirconium dichloride | 1 | 18 |
| 25 | 50 | isopropylenebis(1-indenyl)zirconium dichloride | 1 | 12 |

TABLE 15

| Comparative example | $T_g$ [°C.] | VN [ml/g] | Elongation at break [%] | Yield stress [MPa] |
|---|---|---|---|---|
| 16 | 197 | 67 | 3.60 | — |
| 17 | 127 | 123 | 3.58 | — |
| 18 | 160 | 172 | 3.36 | — |
| 19 | 180 | 96 | 3.55 | — |
| 20 | 224 | 56 | 3.30 | — |
| 21 | 89 | 41 | 2.9 | |
| 22 | 78 | 99 | 5.1 | 62 |
| 23 | 80 | 121 | 8.3 | 61 |
| 24 | 78 | 89 | 8.2 | 31 |
| 25 | 109 | 115 | 4.2 | — |

Comparative Examples 26 to 30

600 cm³ of a solution of norbornene in toluene are placed in a 1.5 dm³ autoclave which has previously been purged thoroughly with ethene. The solution was saturated with ethene by multiple pressurization with ethene. 5 ml of methylaluminoxane solution in toluene (10% strength by weight methylaluminoxane solution having a molar mass of 1300 g/mol according to cryoscopic determination) were metered in countercurrent into the reactor which had been prepared in this way and the mixture was stirred for 30 minutes at 70° C. In some cases, hydrogen was metered in at this point to regulate the molar mass. A solution of the metallocene in 5 ml of methylaluminoxane solution in toluene was added after preactivation for 15 minutes.

While stirring (750 rpm), polymerization was carried out for one hour, with the ethene pressure being maintained by metering in further amounts.

After the end of the reaction time, the polymerization mixture was drained into a vessel and immediately introduced into 5 dm³ of acetone, stirred for 10 minutes and the precipitated product was subsequently, filtered off. The filter cake was washed alternately with three portions each of 10% hydrochloric acid and acetone, the residue was slurried in acetone and filtered off again. The polymer which had been purified in this way was dried at 80° C. under reduced pressure (0.2 bar) for 15 hours.

This gave a colorless polymer. The further reaction conditions and the characteristic data of the polymer are summarized in Tables 16 and 17.

TABLE 16

| Comparative example | Monomer solution [% by weight of norbornene] | Metallocene | Amount of metallocene [mg] | Ethene pressure [bar] | Amount of hydrogen [mmol] |
|---|---|---|---|---|---|
| 26 | 10 | isopropylene-bis(1-indenyl)-zirconium dichloride | 0.11 | 16 | 1.6 |
| 27 | 20 | isopropylene-bis(1-indenyl)-zirconium dichloride | 0.28 | 14 | 1.6 |
| 28 | 30 | isopropylene-bis(1-indenyl)-zirconium dichloride | 0.24 | 14 | 1.6 |
| 29 | 50 | isopropylene-(1-indenyl)-cyclopentadienyl-zirconium dichloride | 0.45 | 12 | — |
| 30 | 50 | isopropylene-(4-indenyl)-cyclopentadienyl-zirconium dichloride | 1.03 | 3 | — |

TABLE 17

| Comparative example | Yield [g] | $T_g$ [° C.] | VN [ml/g] | Activity A* [g/(mmol h)] | $G_p'$ [Pa] |
|---|---|---|---|---|---|
| 26 | 18.9 | 12.7 | 94.4 | 58,000 | 880,000 |
| 27 | 21.8 | 43.5 | 93.3 | 34,000 | 610,000 |
| 28 | 26.7 | 74 | 85.2 | 19,000 | 510,000 |
| 29 | 55.6 | 122 | 65 | 36,000 | 330,000 |
| 30 | 33.6 | 181 | 81 | 12,500 | 200,000 |

What is claimed is:

1. A process for preparing a cycloolefin copolymer which comprises polymerized units of which from 0.1 to 99.9% by weight, based on the total amount of monomers, are derived from at least one polycyclic olefin of the formula IV, V, V', VI, VII, VIII or IX

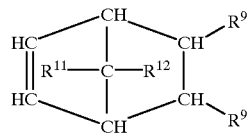
(IV)

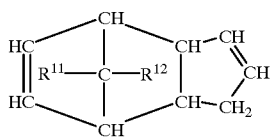
(V)

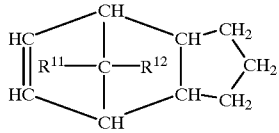
(V')

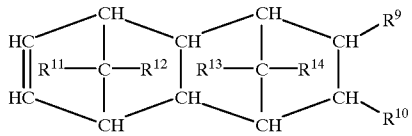
(VI)

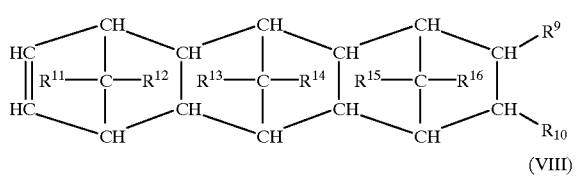
(VII)

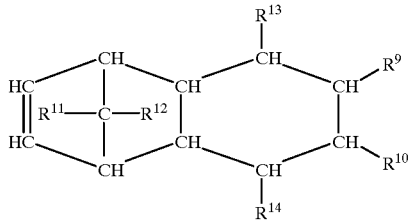
(VIII)

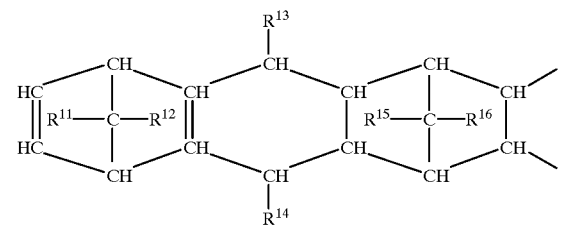
(IX)

where
$R^9$, $R^{10}$, $R^{11}$, $R^{12}$, $R^{13}$, $R^{14}$, $R^{15}$ and $R^{16}$ are identical or different and are each a hydrogen atom or a hydrocarbon radical, where identically numbered radicals in the various formulae can have different meanings, from 0 to 99.9% by weight, based on the total amount of monomers, are derived from at least one monocyclic olefin of the formula X

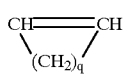
(X)

wherein
q is from 2 to 10, and from 0.1 to 99.9% by weight, based on the total amount of monomers, are derived from at least one acyclic 1-olefin of the formula XI

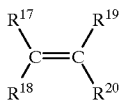

(XI)

wherein $R^{17}$, $R^{18}$, $R^{19}$ and $R^{20}$ are identical or different and are each a hydrogen atom or a hydrocarbon radical, which comprises polymerizing in the presence of a catalyst system comprising at least one cocatalyst and at least one metallocene wherein said at least one metallocene is of the formula II

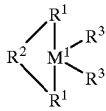

(II)

wherein $M^1$ is titanium, zirconium or hafnium, $R^1$ is an indenyl group or a 4,5,6,7-tetrahydroindenyl group which is substituted in positions 2 and 3 exclusively by hydrogen atoms and in positions 4, 5, 6 and 7 may contain further substituents in place of hydrogen, $R^{1'}$ is a cyclopentadienyl group which is substituted in position 3 by a $C_2$–$C_{40}$-group which is optionally halogenated, $SiR^4{}_3$, $NR^4{}_2$, $SiR(OR^4)_3$, $Si(SR^4)_3$ or $PR^4{}_2$, where $R^4$ are identical or different and are each a halogen atom, a $C_1$–$C_{10}$-alkyl group or a $C_6$–$C_{10}$-aryl group or form a ring system, and in the further positions 2, 4 and 5 may bear further substituents, $R^2$ is a single-, two- or three-membered bridge which links $R^1$ and $R^{1'}$ in each case via position 1 and is

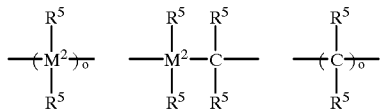

wherein $R^5$ are identical or different and are each a hydrogen atom, a $C_1$–$C_{40}$-group which is optionally halogenated, wherein O=1, 2 or 3, $M^2$ is silicon, $R^3$ are identical or different and are each a hydrogen atom, a $C_1$–$C_{40}$-group, an OH group, a halogen atom or $NR^7{}_2$, where $R^7$ is a halogen atom, a $C_1$–$C_{10}$-alkyl group or a $C_6$–$C_{10}$-aryl group, or $R^3$ together with the atoms connecting them form a ring system, where n=2.

2. The process as claimed in claim 1, wherein the metallocene is a compound of the formula II

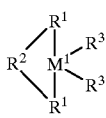

(II)

where $M^1$ is titanium, zirconium or hafnium, $R^1$ is an indenyl group or a 4,5,6,7-tetrahydroindenyl group which is substituted in positions 2 and 3 exclusively by hydrogen atoms and in positions 4, 5, 6 and 7 may bear further substituents such as one or more halogen atoms and/or one or more $C_1$–$C_{10}$-groups in place of hydrogen, $R^{1'}$ is a cyclopentadienyl group which is substituted in position 3 by a $C_2$–$C_{40}$-group such as a $C_2$–$C_{10}$-alkyl group which may be halogenated, a $C_6$–$C_{20}$-aryl group which may be halogenated, a $C_6$–$C_{20}$-aryloxy group, a $C_2$–$C_{12}$-alkenyl group, a $C_7$–$C_{40}$-arylalkyl group, a $C_7$–$C_{40}$-alkylaryl group, a $C_8$–$C_{40}$-arylalkenyl group, $SiR^4{}_3$, $NR^4{}_2$, $SiR(OR^4)_3$, $Si(SR^4)_3$ or $PR^4{}_2$, where $R^4$ are identical or different and are each a halogen atom, a $C_1$–$C_{10}$-alkyl group or a $C_6$–$C_{10}$-aryl group or form a ring system, and in the further positions 2, 4 and 5 may bear further substituents such as one or more $C_1$–$C_{10}$-groups or one or more halogen atoms in place of hydrogen, $R^2$ is a single-, two- or three-membered bridge which links $R^1$ and $R^{1'}$ in each case via position 1 and is preferably

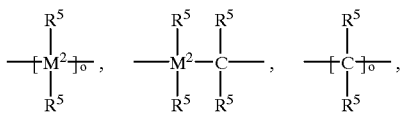

where $R^5$ are identical or different and are each a hydrogen atom, a $C_1$–$C_{40}$-group such as a $C_1$–$C_{10}$-alkyl group which may be halogenated, a $C_6$–$C_{20}$-aryl group which may be halogenated, a $C_6$–$C_{20}$-aryloxy group, a $C_2$–$C_{12}$-alkenyl group, a $C_7$–$C_{40}$-arylalkyl group, a $C_7$–$C_{40}$-alkylaryl group or a $C_8$–$C_{40}$-arylalkenyl group, where O=1, 2 or 3, $M^2$ is silicon, $R^3$ are identical or different and are each a hydrogen atom, a $C_1$–$C_{40}$-group such as a $C_1$–$C_{10}$-alkyl group, a $C_1$–$C_{10}$-alkoxy group, a $C_6$–$C_{10}$-aryl group, a $C_6$–$C_{25}$-aryloxy group, a $C_2$–$C_{10}$-alkenyl group, a $C_7$–$C_{40}$-arylalkyl group or a $C_7$–$C_{40}$-arylalkenyl group, an OH group, a halogen atom or $NR^7{}_2$, where $R^7$ is a halogen atom, a $C_1$–$C_{10}$-alkyl group or a $C_6$–$C_{10}$-aryl group, or $R^3$ together with the atoms connecting them form a ring system, where n=2.

3. The process as claimed in one or more of claims 1 to 2, wherein the metallocene is a compound of the formula II in which $M^1$ is zirconium, $R^1$ is an indenyl group which bears no substituents in place of the hydrogen atoms, $R^{1'}$ is a cyclopentadienyl group which is substituted in position 3 by a $C_2$–$C_{10}$-alkyl group such as ethyl, propyl, isopropyl, tert-butyl or n-butyl, by a $C_6$–$C_{20}$-aryl group, a $C_7$–$C_{10}$-arylalkyl group, a $C_7$–$C_{40}$-alkylaryl group, $SiR^4{}_3$, $NR^4{}_2$, $Si(OR^4)_3$, $Si(SR^4)_3$ or $PR^4{}_2$, where $R^4$ are identical or different and are each a halogen atom, a $C_1$–$C_{40}$-alkyl group or a $C_6$–$C_{10}$-aryl group or form a ring system, and in the further positions 2, 4 and 5 bears no substituents in place of the hydrogen atoms, $R^2$ is a single-, two- or three-membered bridge which links $R^1$ and $R^{1'}$ in each case via position 1 and is preferably

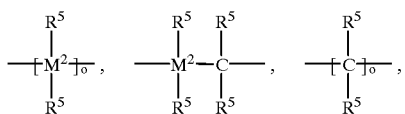

where
R⁵ are identical or different and are each a hydrogen atom, a $C_1$–$C_{40}$-group such as a $C_1$–$C_{10}$-alkyl group which may be halogenated, a $C_6$–$C_{20}$-aryl group which may be halogenated, a $C_6$–$C_{20}$-aryloxy group, a $C_2$–$C_{12}$-alkenyl group, a $C_7$–$C_{40}$-arylalkyl group, a $C_7$–$C_{40}$-alkylaryl group or a $C_8$–$C_{40}$-arylalkenyl group, where O=1, 2 or 3, M² is silicon, R³ are identical or different and are each a hydrogen atom, a $C_1$–$C_{40}$-group such as a $C_1$–$C_{10}$-alkyl group, a $C_1$–$C_{10}$-alkoxy group, a $C_6$–$C_{10}$-aryl group, a $C_6$–$C_{25}$-aryloxy group, a $C_2$–$C_{10}$-alkenyl group, a $C_7$–$C_{40}$-arylalkyl group or a $C_7$–$C_{40}$-arylalkenyl group, an OH group, a halogen atom or NR⁷₂, where R⁷ is a halogen atom, a $C_1$–$C_{10}$-alkyl group or a $C_6$–$C_{10}$-aryl group, or R³ together with the atoms connecting them form a ring system, where n=2.

4. The process as claimed in claim 1, wherein the metallocene is selected from the group consisting of:
isopropylene(1-indenyl)(3-isopropylcyclopentadienyl)zirconium dichloride,
diphenylmethylene(1-indenyl)(3-isopropylcyclopentadienyl)zirconium dichloride,
methylphenylmethylene(1-indenyl)(3-isopropylcyclopentadienyl)zirconiumdichloride,
isopropylene(1-indenyl)(3-t-butylcyclopentadienyl)zirconium dichloride,
diphenylmethylene(1-indenyl)(3-t-butylcyclopentadienyl)zirconium dichloride,
methylphenylmethylene(1-indenyl)(3-t-butylcyclopentadienyl)zirconium dichloride,
isopropylene(1-indenyl)(3-trimethylsilylcyclopentadienyl)zirconium dichloride,
diphenylmethylene(1-indenyl)(3-trimethylsilylcyclopentadienyl)zirconium dichloride,
methylphenylmethylene(1-indenyl)(3-trimethylsilylcyclopentadienyl)zirconium dichloride,
isopropylene(4,5,6,7-tetrahydro-1-indenyl)(3-isopropylcyclopentadienyl)zirconium dichloride,
diphenylmethylene(4,5,6,7-tetrahydro-1-indenyl)(3-isopropylcyclopentadienyl)zirconium dichloride,
methylphenylmethylene(4,5,6,7-tetrahydro-1-indenyl)(3-isopropylcyclopentadienyl)zirconium dichloride,
isopropylene(4,5,6,7-tetrahydro-1-indenyl)(3-t-butylcyclopentadienyl)zirconium dichloride,
diphenylmethylene(4,5,6,7-tetrahydro-1-indenyl)(3-t-butylcyclopentadienyl)zirconium dichloride and
methylphenylmethylene(4,5,6,7-tetrahydro-1-indenyl)(3-t-butylcyclopentadienyl)zirconium dichloride.

5. The process as claimed in claim 1, wherein the metallocene is selected form the group consisting of
isopropylene(1-indenyl)(3-t-butylcyclopentadienyl)zirconium dichloride,
diphenylmethylene(1-indenyl)(3-t-butylcyclopentadienyl)zirconium dichloride,
methylphenylmethylene(1-indenyl)(3-t-butylcyclopentadienyl)zirconium dichloride,
isopropyl(1-indenyl)(3-isopropylcyclopentadienyl)zirconium dichloride,
diphenylmethylene(1-indenyl)(3-isopropylcyclopentadienyl)zirconium dichloride and
methylphenylmethylene(1-indenyl)(3-isopropylcyclopentadienyl)zirconiumdichloride.

6. The process as claimed in claim 5, wherein the cocatalyst used is an aluminoxane.

7. The process as claimed in claim 1, wherein a temperature of from −78 to 150° C. and a pressure of from 0.01 to 64 bar are employed.

8. The process as claimed in claim 6, wherein a temperature of from 0 to 100° C. and a pressure of from 0.01 to 64 bar are employed.

9. The process as claimed in claim 1, wherein the polymerization is carried out in the liquid cycloolefin itself or in cycloolefin solution.

10. A cycloolefin copolymer obtained by the process as claimed in claim 1.

11. The cycloolefin copolymer as claimed in claim 10, which comprises polymerized units of which from 0.1 to 99.9% by weight based on the total amount of monomers, are derived from at least one polycyclic olefin of the formula IV, V, V', VI, VII, VIII or IX (IV)
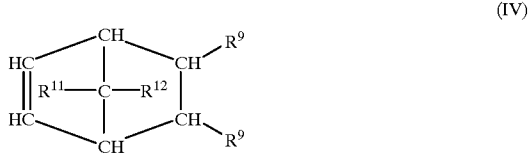

(V)
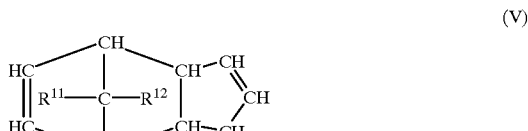

(V')
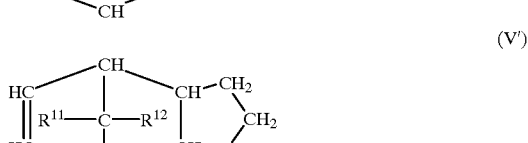

(VI)
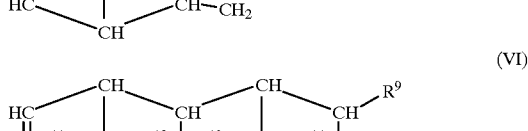

(VII)
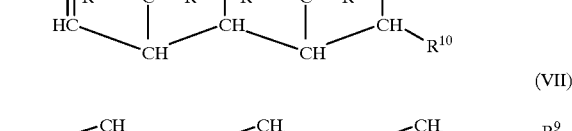

(VIII)
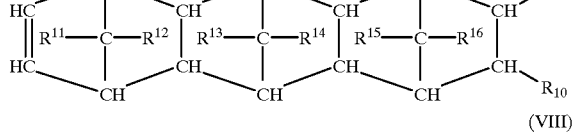

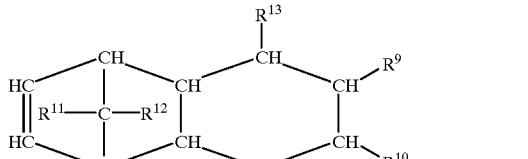

-continued (IX)

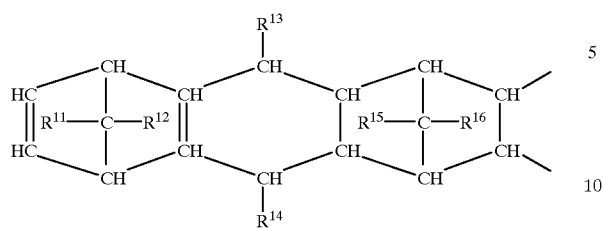

where

R$^9$, R$^{10}$, R$^{11}$, R$^{12}$, R$^{13}$, R$^{14}$, R$^{15}$ and R$^{16}$ are identical or different and are each a hydrogen atom or a hydrocarbon radical, where identically numbered radicals in the various formulae can have different meanings, from 0 to 99.9% by weight, based on the total amount of monomers, are derived from at least one monocyclic olefin of the formula X (X)

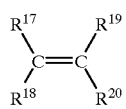

wherein q is from 2 to 10, and from 0.1 to 99.9% by weight, based on the total amount of monomers, are derived from at least one acyclic 1-olefin of the formula XI (XI)

wherein

R$^{17}$, R$^{18}$, R$^{19}$ and R$^{20}$ are identical or different and are each a hydrogen atom or a hydrocarbon radical, wherein the polymerization to the cycloolefin copolymer proceeds with retention of the rings and the cycloolefin copolymer has a plateau modulus G'$_p$ which corresponds to the formula log G'$_p$ ≥ -0.0035T$_g$ + 6.

12. A cycloolefin copolymer as claimed in claim 11 wherein said modulus G'$_p$ corresponds to the formula log G'$_p$ ≥ -0.0035T$_g$ + 6.03.

13. A cycloolefin copolymer as claimed in claim 11 wherein said modulus G'$_p$ corresponds to the formula log G'$_p$ ≥ -0.0035T$_g$ + 6.06.

14. The cycloolefin copolymer as claimed in claim 10, which comprises polymerized units of which from 0.1 to 99.9% by weight, based on the total amount of monomers, are derived from at least one polycyclic olefin of the formula IV, V, V', VI, VII, VIII or IX (IV)
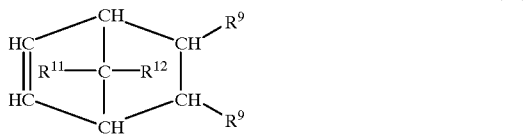

(V)
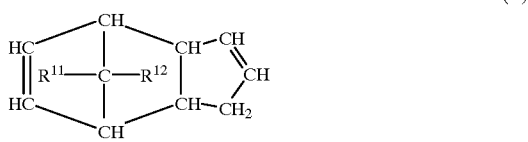

(V')
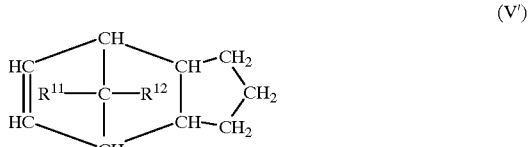

(VI)
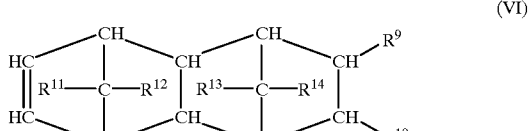

(VII)
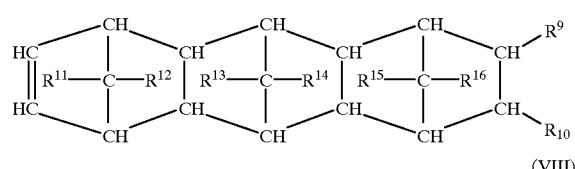

(VIII)
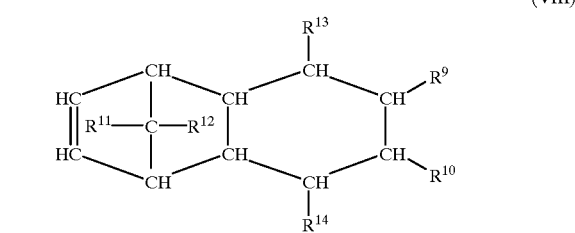

(IX)
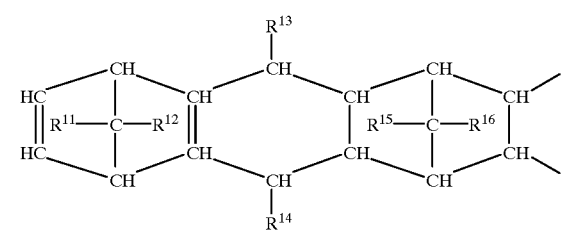

where

R$^9$, R$^{10}$, R$^{11}$, R$^{12}$, R$^{13}$, R$^4$, R$^{15}$ and R$^{16}$ are identical or different and are each a hydrogen atom or a hydrocarbon radical, where identically numbered radicals in the various formulae can have different meanings, from 0 to 99.9% by weight, based on the total amount of monomers, are derived from at least one monocyclic olefin of the formula

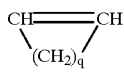

(X)

wherein
q is from 2 to 10, and from 0.1 to 99.9% by weight, based on the total amount of monomers, are derived from at least one acyclic 1-olefin of the formula XI

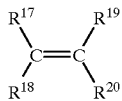

(XI)

wherein
$R^{17}$, $R^{18}$, $R^{19}$ and $R^{20}$ are identical or different and are each a hydrogen atom or a hydrocarbon radical, wherein the polymerization to the cycloolefin copolymer proceeds with retention of the rings and the cycloolefin copolymer has an elongation at break R which corresponds to the formula $R \geq -0.0375\, T_g + 12$.

15. A cycloolefin copolymer as claimed in claim 14, wherein $R \geq -0.0375 T_g + 17$.

16. A cycloolefin polymer as claimed in claim 14, wherein $R \geq -0.0375 T_g + 22$.

17. A cycloolefin copolymer as claimed in claim 11 wherein the polycyclic olefin is a compound of the formula IV or VI in which $R^9$, $R^{10}$, $R^{11}$, $R^{12}$, $R^{13}$, $R^{14}$, $R^{15}$ and $R^{16}$ are identical or different and are each a hydrogen atom or a hydrocarbon radical where identically numbered radicals in the various formulae can have different meanings.

18. A cycloolefin copolymer as claimed in claim 11, wherein the polycyclic olefin is norbornene or tetracyclododecane.

19. A cycloolefin copolymer as claimed in claim 18, wherein the acyclic 1-olefin is ethylene.

20. A molding comprising at least one cycloolefin copolymer as claimed in claim 11.

21. A polymer blend comprising at least one cycloolefin copolymer as claimed in claim 10.

22. The molding as claimed in claim 20, wherein the molding is a film, sheet, hose, pipe, rod, fiber or injection-molded part.

23. The process as claimed in claim 1, wherein the metallocene is a compound of the formula II in which $M^1$ is zirconium, $R^1$ is an indenyt group which bears no substituents in place of the hydrogen atoms, $R^{1'}$ is a cyclopentadienyl group which is substituted in position 3 by a $C_2$–$C_{10}$-alkyl group, a $C_6$–$C_{20}$-aryl group, a $C_7$–$C_{10}$-arylalkyl group, a $C_7$–$C_{40}$-alkylaryl group, a $SiR^4_3$, $NR^4_2$, $Si(OR^4)_3$, $Si(SR^4)_3$ or $PR^4_2$, where $R^4$ are identical or different and each a halogen atom, a $C_1$–$C_{40}$-alkyl group or a $C_6$–$C_{10}$-aryl group or form a ring system, and in the further positions 2, 4 and 5 bears no substituents in place of the hydrogen atoms, $R^2$ is a single-, two- or three-membered bridge which links $R^1$ and $R^{1'}$ in each case via position 1 and is

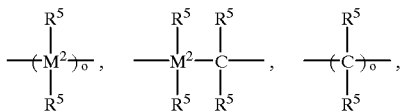

where $R^5$ are identical or different and are each a hydrogen atom, a $C_1$–$C_{40}$-group which may be halogenated, and where O=1, 2 or 3, $M^2$ is silicon, $R^3$ are identical or different and are each a hydrogen atom, a $C_1$–$C_{40}$-group, an OH group, a halogen atom or $NR^7_2$, where $R^7$ is a halogen atom, a $C_1$–$C_{10}$-alkyl group or a $C_6$–$C_{10}$-aryl group or $R^3$ together with the atoms connecting them form a ring system, where n=2.

24. The process as claimed in claim 1, wherein $R^{1'}$ is a $C_2$–$C_{10}$-alkyl group which is optionally halogenated, a $C_6$–$C_{20}$-aryl group which is optionally halogenated, a $C_6$–$C_{20}$-aryloxy group, a $C_2$–$C_{12}$-alkenyl group, a $C_7$–$C_{40}$-arylalkyl group, a $C_7$–$C_{40}$-alkylaryl group a $C_8$–$C_{40}$-arylalkenyl group.

25. The process as claimed in claim 1, wherein the catalyst system consists essentially of at least one cocatalyst and at least one metallocene.

* * * * *

UNITED STATES PATENT AND TRADEMARK OFFICE
CERTIFICATE OF CORRECTION

PATENT NO. : 6,316,560 B1
DATED : November 13, 2001
INVENTOR(S) : Jacobs et al.

It is certified that error appears in the above-identified patent and that said Letters Patent is hereby corrected as shown below:

Title page,
ABSTRACT, line 2, "...polyermization of 0.1-99.0 wt%, with" should read as -- ...polyermization of 0.1-99.9 wt%, with --.
Line 4, after the word "polycyclic" the word -- olefin -- should be added Column 27,
Line 20, " 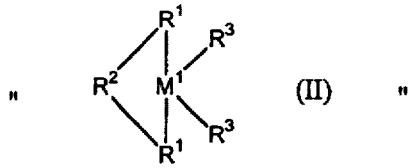 (II) "

should read as -- 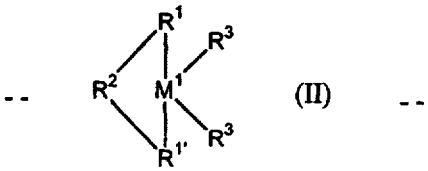 (II) --

Column 27,
Line 65,

" 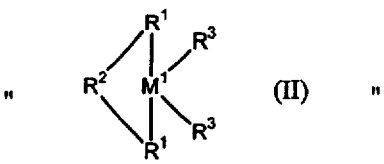 (II) "

should read as -- 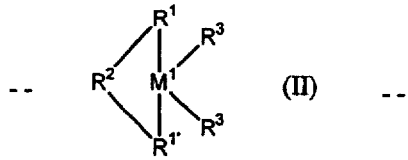 (II) --

UNITED STATES PATENT AND TRADEMARK OFFICE
CERTIFICATE OF CORRECTION

PATENT NO. : 6,316,560 B1
DATED : November 13, 2001
INVENTOR(S) : Jacobs et al.

It is certified that error appears in the above-identified patent and that said Letters Patent is hereby corrected as shown below:

Column 30,
Line 22, "99.9% by weight base on the..." should read as -- 99.9% by weight, based on the... --

Column 32,
Line 67, please add after the word "formula" -- X --

Column 34,
Line 5, "$R^1$ is an indenyt group..." should read as -- $R^1$ is an indenyl group... --

Signed and Sealed this

Twenty-third Day of April, 2002

Attest:

Attesting Officer

JAMES E. ROGAN
*Director of the United States Patent and Trademark Office*